US012752683B2

(12) United States Patent
Makita et al.

(10) Patent No.: US 12,752,683 B2
(45) Date of Patent: Oct. 6, 2026

(54) SEAT AIR-CONDITIONING DEVICE

(71) Applicant: Panasonic Automotive Systems Co., Ltd., Kanagawa (JP)

(72) Inventors: Yuki Makita, Kanagawa (JP); Tatehiko Inoue, Osaka (JP); Yoshihiko Maeda, Hyogo (JP); Takuya Nakagawa, Shiga (JP); Yuki Nagakura, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 365 days.

(21) Appl. No.: 18/620,344

(22) Filed: Mar. 28, 2024

(65) Prior Publication Data

US 2024/0326668 A1 Oct. 3, 2024

(30) Foreign Application Priority Data

Mar. 31, 2023 (JP) ................................ 2023-058940
Mar. 31, 2023 (JP) ................................ 2023-058941
Dec. 21, 2023 (JP) ................................ 2023-216066

(51) Int. Cl.
*B60N 2/56* (2006.01)

(52) U.S. Cl.
CPC ..................................... *B60N 2/56* (2013.01)

(58) Field of Classification Search
CPC ................................ B60N 2/56; B60N 2/5657
See application file for complete search history.

(56) References Cited

U.S. PATENT DOCUMENTS

2024/0010047 A1* 1/2024 Feltham ................. B60H 1/248

FOREIGN PATENT DOCUMENTS

JP 2020199990 A 12/2020

OTHER PUBLICATIONS

Ito et al., "Recovery Effect in Arousal Level and Work Efficiency by Temporary Stimulative Airflow," Human interface; the transaction of Human Interface Society, vol. 23, No. 4. 2021, pp. 547-558, 42 pages. (With English Translation).
Nissan Motor Co., Ltd., "Forest Air-conditioning System," [URL] https://www.nissan-global.com/EN/INNOVATION/TECHNOLOGY/ARCHIVE/FOREST_AC/, Mar. 2011, 6 pages.

* cited by examiner

*Primary Examiner* — Allen R. B. Schult
(74) *Attorney, Agent, or Firm* — Seed Intellectual Property Law Group LLP

(57) ABSTRACT

A seat air-conditioning device is for use in a seat, and includes: a blower provided in the seat; a first ventilation path that is provided in the seat and leads, to an upper body of a person seated in the seat, air blown by the blower and to be blown out from a first outlet; a second ventilation path that is provided in the seat and leads, to the upper body of the person seated in the seat, air blown by the blower and to be blown out from a second outlet; and an air-volume control mechanism that is provided in the seat, and passively controls a first air volume of air blown out from the first outlet and a second air volume of air blown out from the second outlet.

20 Claims, 26 Drawing Sheets

SEAT AIR-CONDITIONING DEVICE

CROSS REFERENCE TO RELATED APPLICATIONS

The present application is based on and claims priority of Japanese Patent Application No. 2023-058940 filed on Mar. 31, 2023, Japanese Patent Application No. 2023-058941 filed on Mar. 31, 2023, and Japanese Patent Application No. 2023-216066 filed on Dec. 21, 2023.

FIELD

The present disclosure relates to a seat air-conditioning device that blows air to a person seated in a seat.

BACKGROUND

Recently, a seat air-conditioning device that blows conditioned air from a seat to an occupant has been known. A seat air-conditioning device according to conventional technology can improve comfortability by blowing air differently in a transition stage that is an initial cooling stage and in a stable stage in which an indoor temperature is close to a target temperature.

For example, a vehicle seat air-conditioning device according to Patent Literature (PTL) 1 blows air to the neck and the back of an occupant by a control device controlling a first on-off valve, a second on-off valve, and a third on-off valve.

CITATION LIST

Patent Literature

PTL 1: Japanese Unexamined Patent Application Publication No. 2020-199990

SUMMARY

However, the vehicle seat air-conditioning device according to PTL 1 stated above is susceptible of further improvement.

In view of this, the present disclosure provides a seat air-conditioning device that achieves further improvement over the conventional vehicle seat air-conditioning device.

A seat air-conditioning device according to an aspect of the present disclosure is a seat air-conditioning device for use in a seat, the seat air-conditioning device including: a blower provided in the seat; a first ventilation path that is provided in the seat and leads, to an upper body of a person seated in the seat, air blown by the blower and to be blown out from a first outlet; a second ventilation path that is provided in the seat and leads, to the upper body of the person seated in the seat, air blown by the blower and to be blown out from a second outlet; and an air-volume control mechanism that is provided in the seat, and passively controls a first air volume of air blown out from the first outlet and a second air volume of air blown out from the second outlet.

The seat air-conditioning device according to the present disclosure can achieve further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Note that the embodiments explained below each show a general or specific example. The numerical values, shapes, materials, elements, the arrangement and connection of the elements, steps, and the processing order of the steps, for instance, explained in the following embodiments are mere examples, and thus are not intended to limit the present disclosure. Among the elements in the following embodiments, elements not recited in any of the independent claims are explained as optional elements.

In addition, the drawings are schematic diagrams, and do not necessarily provide strictly accurate illustration. Further, the same numeral is given to the same structural member throughout the drawings.

In the following embodiments, expressions such as a plate shape, an X-axis direction, and substantially parallel are used. For example, the plate shape, the X-axis direction, and being substantially parallel mean not only a complete plate shape, the complete X-axis direction, and being completely parallel, but also a substantial plate shape, a substantial X-axis direction, and being substantially parallel, or stated differently also mean that an error of about several percent is included. Furthermore, a plate shape, the X-axis direction, and being substantially parallel mean a plate shape, the X-axis direction, and being substantially parallel in a scope in which effects yielded by the present disclosure can be achieved. The same also applies to other expressions that include “shape”, “direction”, and “substantially”.

Figure 1:
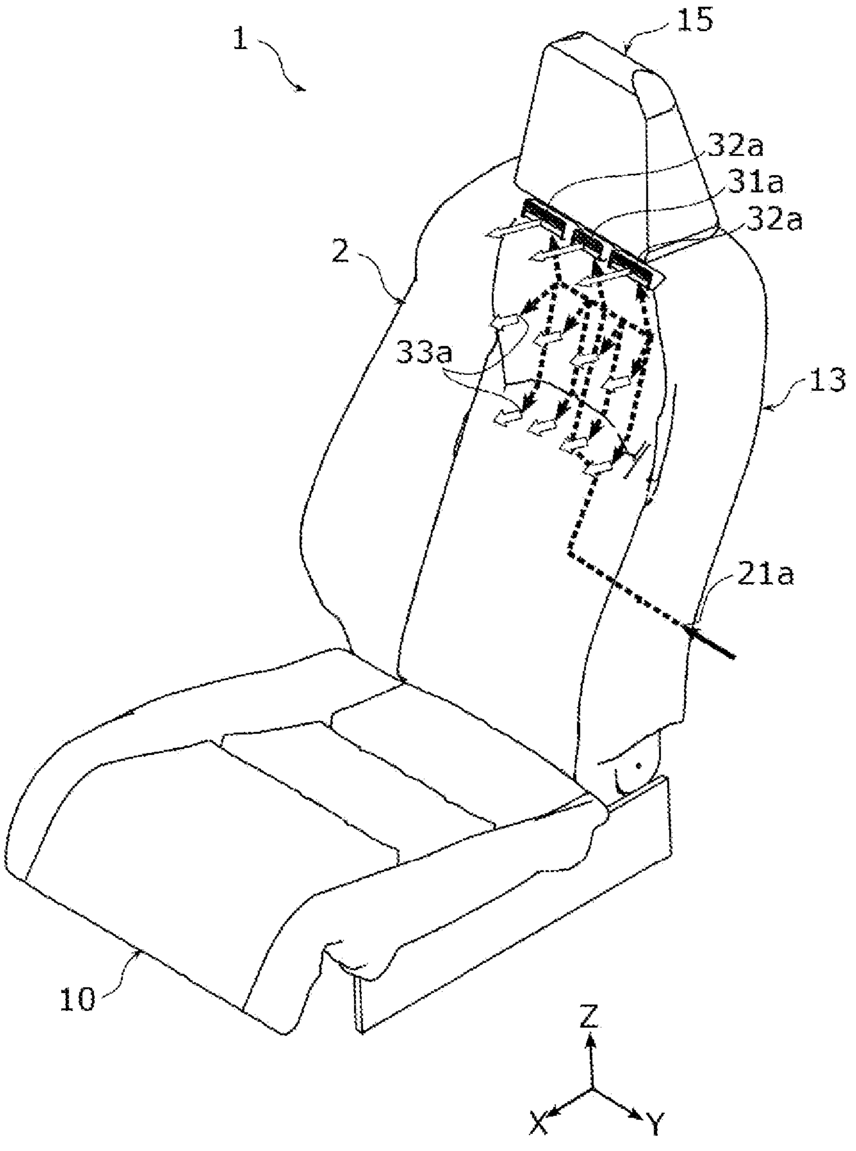
FIG. 1 is a perspective view of an appearance of a seat air-conditioning device according to Embodiment 1.

In the explanation below, the front-and-rear direction of a seat is referred to as the X-axis direction, and the up-and-down direction of the seat is referred to as the Z-axis direction. Furthermore, the right-and-left direction of the seat, that is, a direction perpendicular to the X-axis direction and the Z-axis direction is referred to as the Y-axis direction. The front side of the seat in the X-axis direction is referred to as a positive side, and the rear side of the seat in the X-axis direction is referred to as a negative side. The left side in the Y-axis direction in FIG. 1 is referred to as a positive side, and the opposite side therefrom in the Y-axis direction is referred to as a negative side. In addition, the right side is the right of a person with respect to a travel direction of a vehicle when the person is seated in a seat, and is a negative Y-axis side. Moreover, the left side is the left of a person with respect to a travel direction of a vehicle when the person is seated in a seat, and is a positive Y-axis side. The upper side of the seat in the Z-axis direction is referred to as a positive side, and the lower side of the seat in the Z-axis direction is referred to as a negative side. The same applies to FIG. 2 and the drawings thereafter.

Hereinafter, embodiments are to be specifically explained with reference to the drawings.

Embodiment 1

<Configuration>

First, seat air-conditioning device 1 according to the present embodiment is to be explained with reference to FIG. 1 to FIG. 10.

Figure 2:
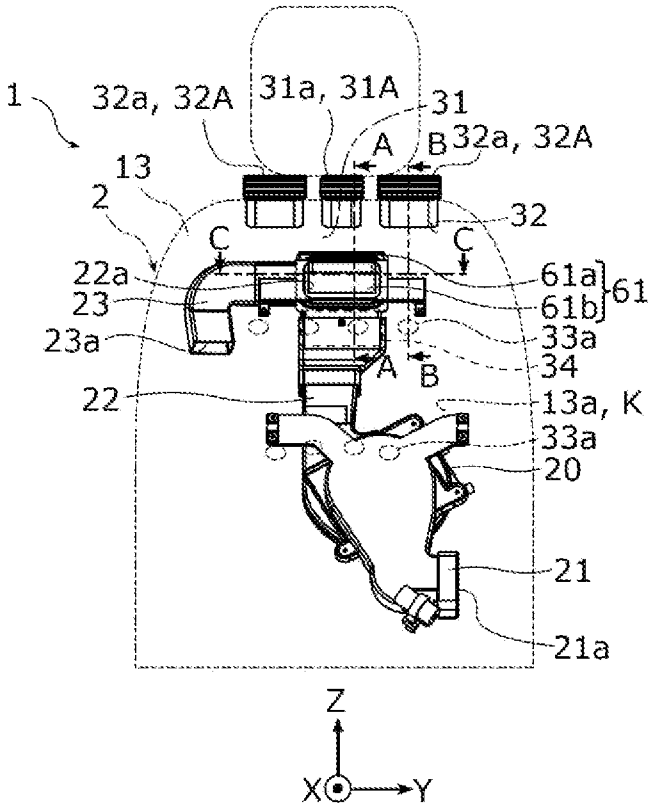
FIG. 2 is a front view of the seat air-conditioning device according to Embodiment 1.
Figure 3:
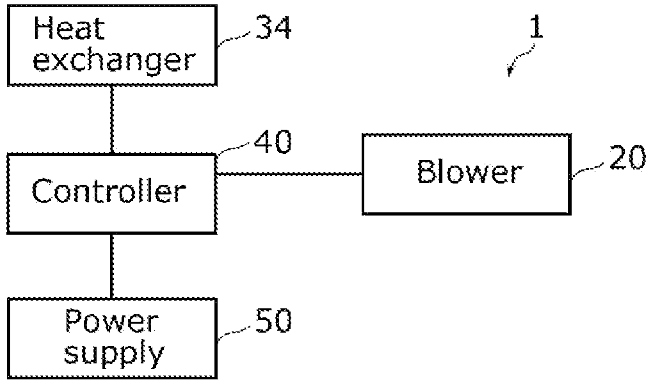
FIG. 3 is a block diagram illustrating the seat air-conditioning device according to Embodiment 1.
Figure 4:
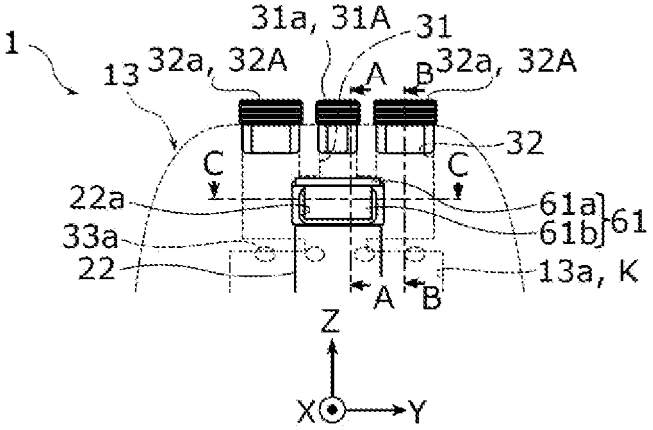
FIG. 4 is a front view of an enlarged portion of the seat air-conditioning device according to Embodiment 1.
Figure 5A:
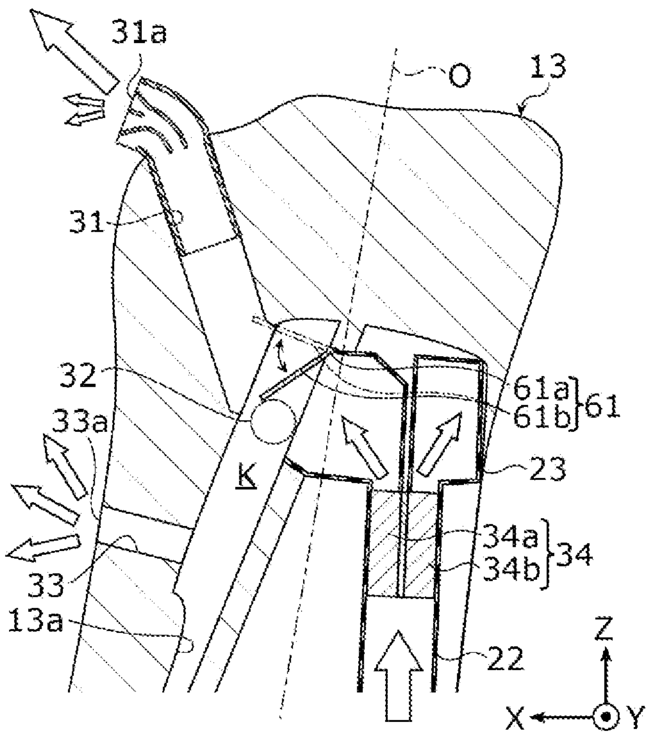
FIG. 5A is a cross sectional view of the seat air-conditioning device according to Embodiment 1, which is taken along line A-A in FIG. 2.
Figure 5B:
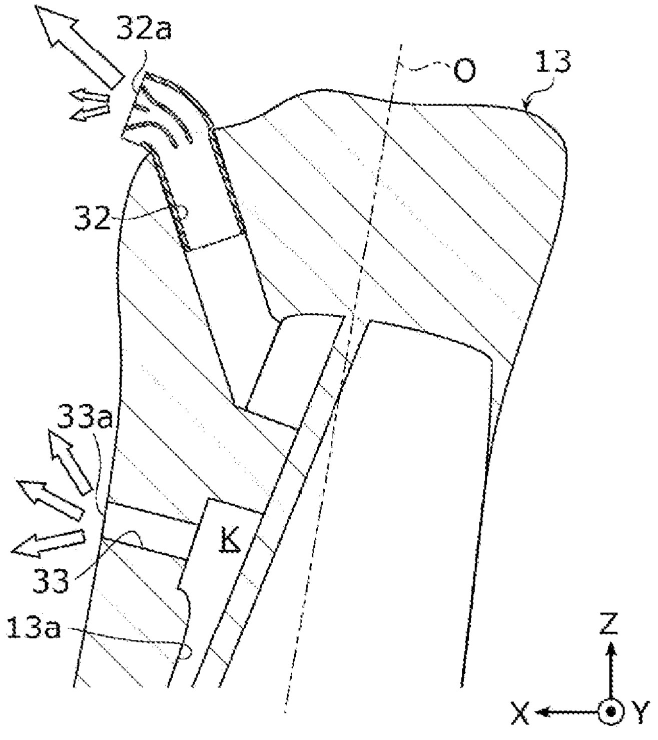
FIG. 5B is a cross sectional view of the seat air-conditioning device according to Embodiment 1, which is taken along line B-B in FIG. 2.
Figure 6:
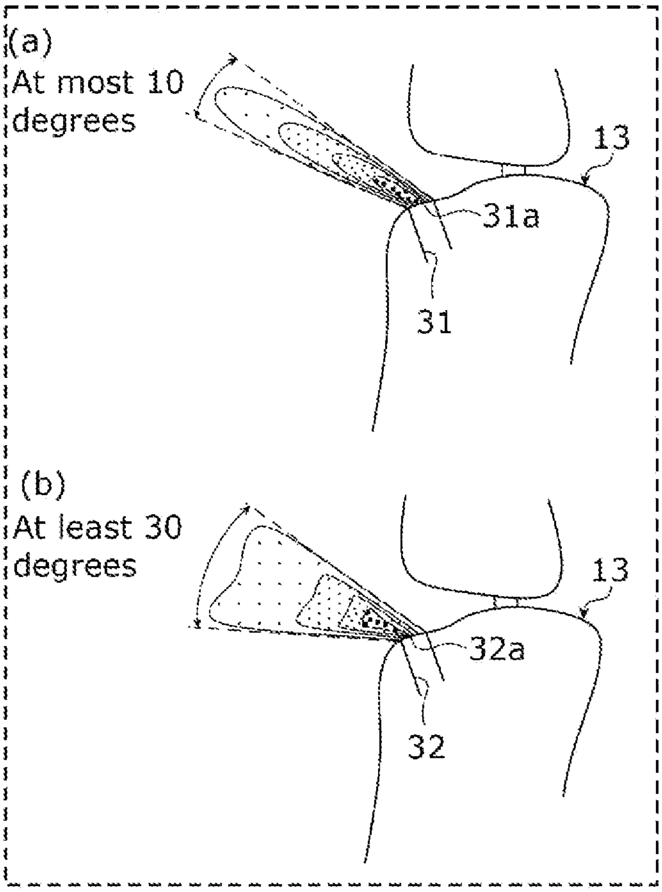
FIG. 6 illustrates ranges of air velocity distribution of air blown out from a first outlet and each second outlet when a seat backrest viewed laterally.
Figure 7:
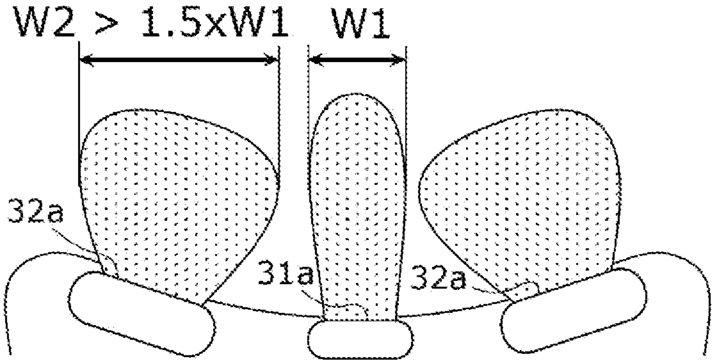
FIG. 7 illustrates ranges of air velocity distribution of air blown out from the first outlet and the second outlets when the seat backrest is viewed from above.
Figure 8:
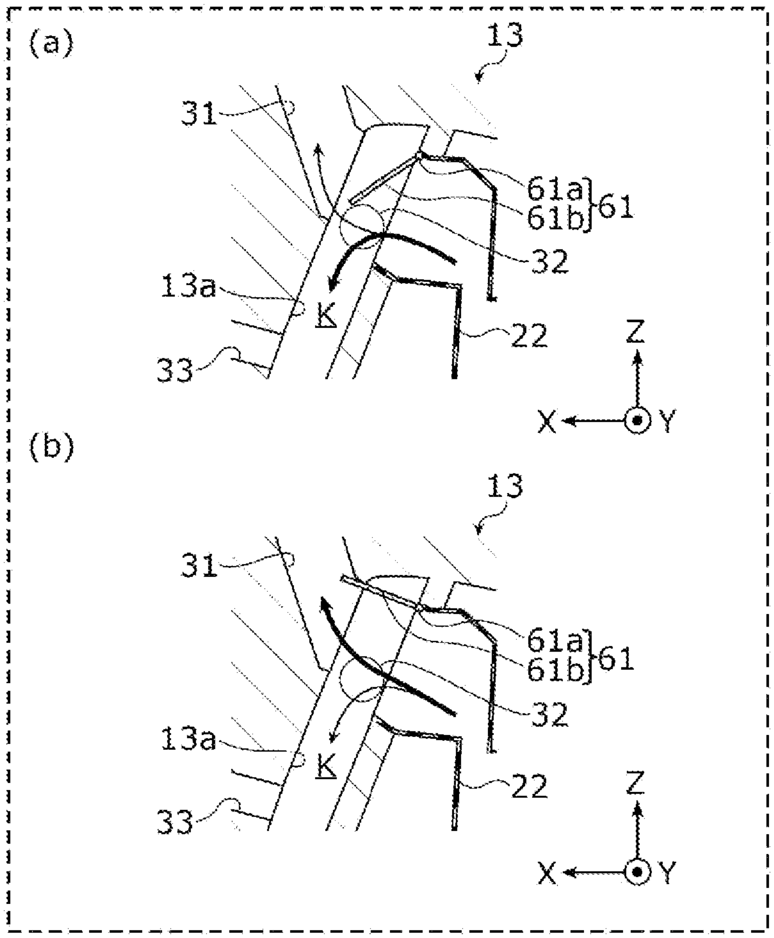
FIG. 8 shows cross-sectional views of an enlarged portion showing movement of a first flap according to the flow rate of air flowing through an air duct and flows of air.
Figure 9:
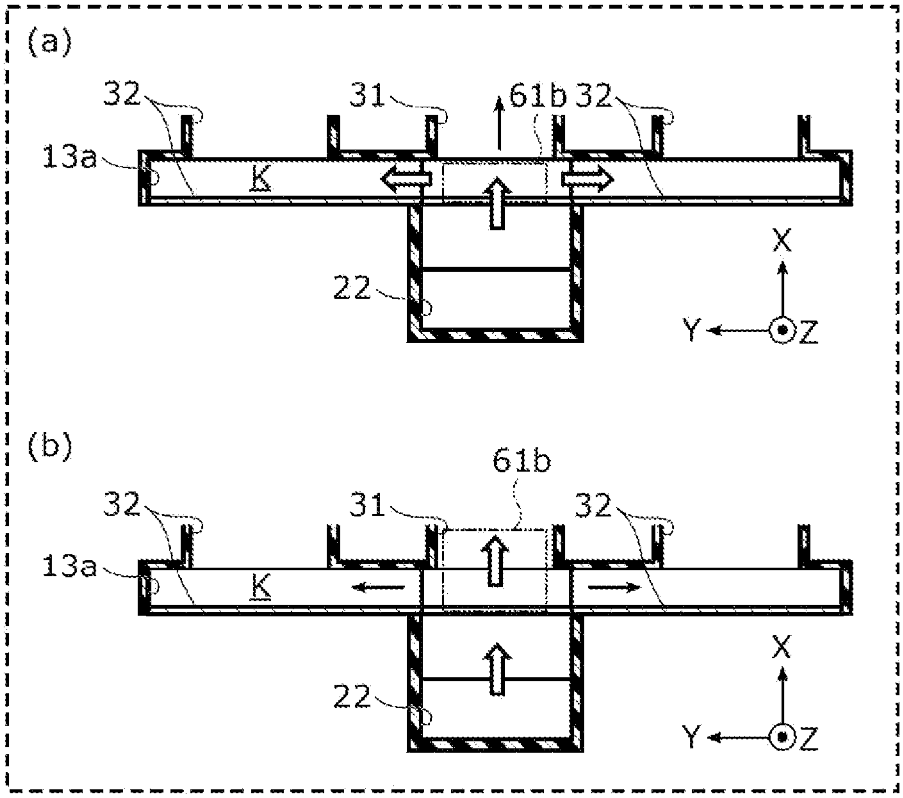
FIG. 9 shows cross sectional views of the seat air-conditioning device according to Embodiment 1, which is taken along line C-C in FIG. 2.
Figure 10:
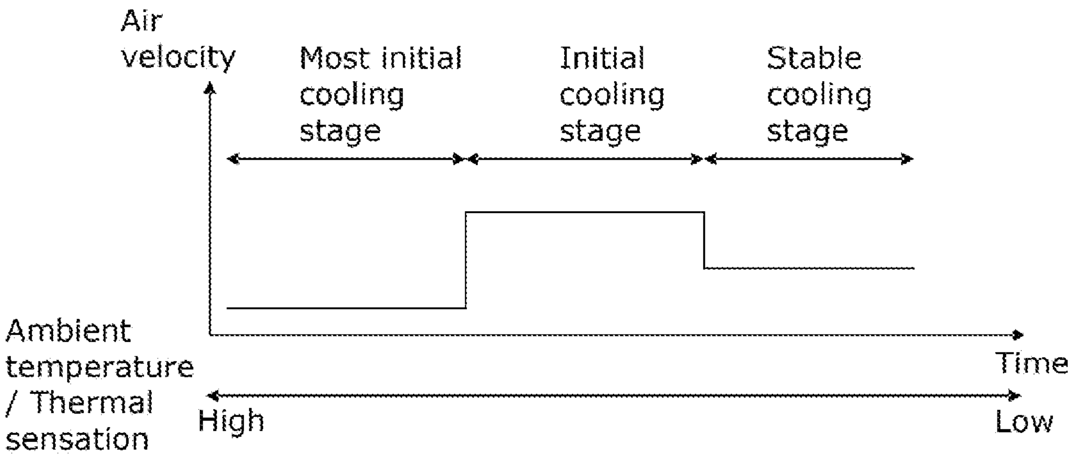
FIG. 10 illustrates a relation between the air velocity in a cabin, time, an ambient temperature, and thermal sensation.

FIG. 1 is a perspective view of an appearance of seat air-conditioning device 1 according to Embodiment 1. In FIG. 1, flows of air in seat 2 are shown by broken lines, and air blown out from seat 2 is shown by hollow arrows. FIG. 2 is a front view of seat air-conditioning device 1 according to Embodiment 1. FIG. 3 is a block diagram illustrating seat air-conditioning device 1 according to Embodiment 1. FIG. 4 is a front view of an enlarged portion of seat air-conditioning device 1 according to Embodiment 1. FIG. 5A is a cross sectional view of seat air-conditioning device 1 according to Embodiment 1, which is taken along line A-A in FIG. 2. FIG. 5B is a cross sectional view of seat air-conditioning device 1 according to Embodiment 1, which is taken along line B-B in FIG. 2. FIG. 6 illustrates ranges of air velocity distribution of air blown out from first outlet 31*a* and each second outlet 32*a* when seat backrest 13 is viewed laterally. FIG. 7 illustrates ranges of air velocity distribution of air blown out from first outlet 31*a* and second outlets 32*a* when seat backrest 13 is viewed from above. FIG. 8 shows cross-sectional views of an enlarged portion showing movement of first flap 61*b* according to the flow rate of air flowing through air duct 22 and flows of air. FIG. 9 shows cross sectional views of seat air-conditioning device 1 according to Embodiment 1, which is taken along line C-C in FIG. 2. FIG. 10 illustrates a relation between the air velocity in a cabin, time, an ambient temperature, and thermal sensation.

As illustrated in FIG. 1, for example, seat air-conditioning device 1 provided in, for instance, a vehicle can cool and warm a person seated in seat 2 by blowing air toward the upper half of the body of the person seated in seat 2 from behind. Specifically, seat air-conditioning device 1 can cool and warm the body of the person seated in seat 2 by drawing in air in the cabin and blowing the air drawn in toward the head, neck, shoulder, and back, for instance, that are the upper body of the person.

As illustrated in FIG. 2 to FIG. 5B, such seat air-conditioning device 1 includes seat 2, blower 20, inlet duct 21, air duct 22, exhaust duct 23, first ventilation path 31, second ventilation path 32, third ventilation paths 33, an air-volume control mechanism, heat exchanger 34, controller 40, and power supply 50.

Seat 2 includes seating portion 10 for a person to be seated, seat backrest 13, and headrest 15.

Seating portion 10 is a seat cushion that supports, for instance, buttocks and thighs of a person seated in seat 2. Seating portion 10 includes a first seat pad that corresponds to a cushion material, and a first seat cover that covers the first seat pad.

The first seat pad is made of a cushion material such as, for example, urethane foam. The first seat pad has a substantially quadrilateral plate shape having a thickness, and is provided in an orientation in which the first seat pad tilts relative to the X-Y plane at a predetermined angle. The first seat cover covers the first seat pad. The first seat cover is a leather cover or a fabric cover, for example.

Seat backrest 13 is a backrest portion that supports the shoulders, the back, and the waist of a person seated in seat 2. Seat backrest 13 is elongated in the Z-axis direction, and provided rising from seating portion 10. Seat backrest 13 can adjust the backrest angle by rotating about the Y axis according to the posture of the person. Seat backrest 13 includes a second seat pad that corresponds to a cushion material, and a second seat cover that covers the second seat pad.

The second seat pad is made of a cushion material such as, for example, urethane foam. The second seat pad has a substantially quadrilateral plate shape having a thickness. The second seat cover covers the second seat pad. The second seat cover is a leather cover or a fabric cover, for example.

As illustrated in FIG. 2, FIG. 4, FIG. 5A, and FIG. 5B, recess 13*a* is formed in the back surface of seat backrest 13 (a surface on the X-axis negative side). Accordingly, ventilation space K is defined by recess 13*a* in the back surface of seat backrest 13. Ventilation space K is connected to first ventilation path 31, second ventilation path 32, third ventilation paths 33, and air duct 22, which are for blowing out air drawn in from inlet opening 21*a* of inlet duct 21. Accordingly, air blown by blower 20 and passing through air duct 22 flows into ventilation space K via air-blow opening 22*a*. Then, the air that has flown in is led from ventilation space K to first ventilation path 31, second ventilation path 32, and third ventilation paths 33, and is blown out from first outlet 31*a*, second outlets 32*a*, and third outlets 33*a*.

As illustrated in FIG. 4, FIG. 5A, and FIG. 5B, first outlet 31*a* is provided more forward (on the X axis positive side) than central axis O that halves the thickness direction when seat backrest 13 of seat 2 is viewed from the side surface (viewed in the Y-axis direction). Air blown by blower 20 can be blown out from first outlet 31*a* toward the upper body of a person seated in seat 2. First outlet 31*a* in the present embodiment is provided in the surface of seat backrest 13 on the Z-axis positive side.

Second outlets 32*a* are provided more forward (on the X axis positive side) than central axis O that halves the thickness direction when seat backrest 13 of seat 2 is viewed from the side surface (viewed in the Y-axis direction). Air blown by blower 20 can be blown out from second outlets 32*a* toward the upper body of a person seated in seat 2. Second outlets 32*a* in the present embodiment are provided in the surface of seat backrest 13 on the Z-axis positive side. Second outlets 32*a* are provided on the Y-axis positive side and the Y-axis negative side of first outlet 31*a*, that is, on both sides of first outlet 31*a*.

The opening area of first outlet 31*a* is smaller than the opening area of each second outlet 32*a*. As illustrated in (a) of FIG. 6, when seat backrest 13 is laterally viewed, an air velocity distribution range in which the air velocity of air blown out from first outlet 31*a* is at least 1 m/s spreads at most 10 degrees. Further, as illustrated in (b) of FIG. 6, an air velocity distribution range in which the air velocity of air blown out from each second outlet 32*a* is at least 1 m/s spreads at least 30 degrees. As illustrated in FIG. 7, when seat backrest 13 is viewed from above, air velocity distribution range W2 in which the air velocity of air blown out from each second outlet 32*a* is at least 1 m/s has a value greater than a value resulting from multiplying, by 1.5, the value of air velocity distribution range W1 in which the air velocity of air blown out from first outlet 31*a* is at least 1 m/s. Accordingly, the air velocity distribution range of air blown out from first outlet 31*a* is smaller than the air velocity distribution range of air blown out from each second outlet 32*a*. From this, the range in which air blown out from each second outlet 32*a* is diffused can be said to be larger than the range in which air blown out from first outlet 31*a* is diffused. In this manner, air blown out from first outlet 31*a* can be directly blown onto, for instance, the neck and the head of a person. Furthermore, air blown out from each second outlet 32*a* can be more widely blown out onto the neck, the cheeks, the head, and the shoulder of a person than air blown out from first outlet 31*a*.

In the present embodiment, first ventilation path 31 is provided with a blowing portion, and second ventilation path 32 is provided with blowing portions. The blowing portions are hollow casings that can guide air flowing from ventilation space K to first ventilation path 31 and second ventilation path 32, and the air from ventilation space K can be blown out from the blowing portions. The blowing portions include first blowing portion 31A and second blowing portions 32A. First blowing portion 31A provided in first ventilation path 31 defines first ventilation path 31 that includes first outlet 31*a*. Second blowing portions 32A provided in second ventilation path 32 define second ventilation path 32 that includes second outlets 32*a*. The blowing portions are configured to allow air to be blown out in the X axis positive direction. Specifically, first blowing portion 31A includes an opening plane of first outlet 31*a* that is orthogonal to the X-axis direction. Second blowing portions 32A each include an opening plane of second outlet 32*a* that is orthogonal to the X-axis direction. Accordingly, air can be blown out from first blowing portion 31A and second blowing portions 32A in the X-axis positive direction. First blowing portion 31A and second blowing portions 32A are each provided with a louver, and thus the air direction can be controlled by adjusting the orientation of the louver.

Third outlets 33*a* are provided more forward (on the X axis positive side) than central axis O that halves the thickness direction when seat backrest 13 of seat 2 is viewed from the side surface (viewed in the Y-axis direction). Air blown by blower 20 can be blown out from third outlets 33*a* toward the back of a person seated in seat 2. Third outlets 33*a* in the present embodiment are provided in the front surface of seat backrest 13 (in the surface on the X-axis positive side).

As illustrated in FIG. 1 and FIG. 2, headrest 15 is provided at an end portion of seat backrest 13 on the Z-axis positive side. Headrest 15 is one of members included in seat 2, and holds the head of a person seated in seat 2 when impact occurs. Headrest 15 is connected to seat backrest 13 by a support post.

Seat backrest 13 includes blower 20, inlet duct 21, air duct 22, exhaust duct 23, first ventilation path 31, second ventilation path 32, third ventilation paths 33, the air-volume control mechanism, and heat exchanger 34. Note that blower 20, inlet duct 21, air duct 22, first ventilation path 31, second ventilation path 32, third ventilation paths 33, the air-volume control mechanism, and heat exchanger 34 are housed in the second seat pad of seat backrest 13.

In the present embodiment, blower 20, inlet duct 21, air duct 22, first ventilation path 31, second ventilation path 32, third ventilation paths 33, the air-volume control mechanism, and heat exchanger 34 are provided in seat backrest 13 on the rear side (on the X-axis negative side).

Inlet duct 21 is connected to blower 20. In the present embodiment, inlet duct 21 is provided with inlet opening 21*a* being located on the Y-axis positive side of seat backrest 13.

Air duct 22 is connected to blower 20, ventilation space K, and exhaust duct 23. Specifically, one end of air duct 22 is connected to blower 20, and the other end thereof is connected to ventilation space K.

Exhaust duct 23 is connected between the one end and the other end of air duct 22.

In the present embodiment, exhaust duct 23 is provided with exhaust opening 23*a* being located on the Y-axis negative side of seat backrest 13. Accordingly, exhaust opening 23*a* is provided as distant as possible from inlet opening 21*a* with blower 20 being provided therebetween.

As illustrated in FIG. 2 and FIG. 3, blower 20 is connected to inlet duct 21 and air duct 22. Blower 20 draws in air from inlet opening 21*a* of inlet duct 21 provided in seat backrest 13 of seat 2 on the X-axis negative side and sends the air drawn in to air duct 22, so that air is blown out from first outlet 31*a*, second outlets 32*a*, and third outlets 33*a*. Specifically, controller 40 controls the operation of blower 20, so that blower 20 draws in air from inlet opening 21*a* of inlet duct 21, causes the air drawn in through inlet duct 21 to be blown out from first outlet 31*a* via air duct 22, ventilation space K, and first ventilation path 31, causes the air drawn in through inlet duct 21 to be blown out from second outlets 32*a* via air duct 22, ventilation space K, and second ventilation path 32, or causes the air drawn in through inlet duct 21 to be blown out from third outlets 33*a* via air duct 22, ventilation space K, and third ventilation paths 33.

When the operation of blower 20 is controlled by controller 40 and blower 20 draws in air from inlet opening 21*a* of inlet duct 21, heat-exchanged air is blown out via air duct 22 and exhaust duct 23.

Heat exchanger 34 that includes a Peltier element and a plurality of fins is provided at a connection portion in which air duct 22 and exhaust duct 23 are connected. Heat exchanger 34 is controlled based on the application of electric current.

Heat exchanger 34 includes air-blow heat-exchange portion 34*a* and air-exhaust heat exchange portion 34*b*.

Air-blow heat-exchange portion 34*a* is provided in air duct 22, and air-exhaust heat exchange portion 34*b* is provided in exhaust duct 23. Accordingly, air that has passed through air-blow heat-exchange portion 34*a* is led by air duct 22 and sent to ventilation space K. Thus, air duct 22 can send air that has undergone heat exchange in heat exchanger 34 to ventilation space K. Furthermore, air that has passed through air-exhaust heat exchange portion 34*b* is led by exhaust duct 23 and blown out from exhaust opening 23*a*. Thus, air that has undergone heat exchange in heat exchanger 34 can be blown out from exhaust duct 23.

For example, when heat exchanger 34 is used as a cooling device, controller 40 controls electric current to be applied to heat exchanger 34 by controlling power supply 50, so that the temperature of air passing through air-blow heat-exchange portion 34*a* can be made lower than the temperature of air passing through air-exhaust heat exchange portion 34*b*. Accordingly, air having a low temperature, which results from undergoing heat exchange in air-blow heat-exchange portion 34*a*, is sent to ventilation space K and blown out from the outlets, and air having a high temperature, which results from undergoing heat exchange in air-exhaust heat exchange portion 34*b*, is sent to exhaust duct 23 and blown out from exhaust opening 23*a*.

Further, when heat exchanger 34 is used as a heating device, controller 40 controls electric current to be applied to heat exchanger 34 by controlling power supply 50, so that the temperature of air passing through air-blow heat-exchange portion 34*a* can be made higher than the temperature of air passing through air-exhaust heat exchange portion 34*b*. Accordingly, air having a high temperature, which results from undergoing heat exchange in air-blow heat-exchange portion 34*a*, is sent to ventilation space K and blown out from the outlets, and air having a low temperature, which results from undergoing heat exchange in air-exhaust heat exchange portion 34*b*, is sent to exhaust duct 23 and blown out from exhaust opening 23*a*.

First ventilation path 31, second ventilation path 32, and third ventilation paths 33 are connected to ventilation space K. In the present embodiment, first ventilation path 31, second ventilation path 32, and third ventilation paths 33 are through-holes formed from the surface of seat backrest 13 to reach ventilation space K, but may be ducts made of resin, for instance. In this case, a duct that defines first ventilation path 31, a duct that defines second ventilation path 32, and ducts that define third ventilation paths 33 may be provided in the through-holes formed in seat backrest 13.

Second ventilation path 32 branches and extends from ventilation space K at a position distant from first ventilation path 31. In the present embodiment, second ventilation path 32 is provided on the Y-axis positive and negative sides of first ventilation path 31, branches from ventilation space K, and extends in the Z-axis positive direction.

Third ventilation paths 33 are provided on a further negative side of the Z axis than first ventilation path 31 and second ventilation path 32, branch from ventilation space K, and extend in the X axis positive direction. Plural third ventilation paths 33 are formed in seat backrest 13, and thus plural third outlets 33*a* are formed in seat backrest 13 more widely than first outlet 31*a* and second outlets 32*a*.

Air led to first ventilation path 31 is blown out from first outlet 31*a*, air led to second ventilation path 32 is blown out from second outlets 32*a*, and air led to third ventilation paths 33 is blown out from third outlets 33*a*.

The length of first ventilation path 31 is set shorter than the length of second ventilation path 32. In this case, the length of first ventilation path 31 is a length from a joined portion of first ventilation path 31 and second ventilation path 32 in ventilation space K to first outlet 31*a*. Further, the length of second ventilation path 32 is a total length from the joined portion of first ventilation path 31 and second ventilation path 32 in ventilation space K to second outlets 32*a*. The joined portion is ventilation space K on the X-axis positive side of air-blow opening 22*a*. Accordingly, when the cabin is to be cooled, the temperature of air blown out from first outlet 31*a* via first ventilation path 31 can be made lower than the temperature of air blown out from second outlets 32*a* via second ventilation path 32.

The air-volume control mechanism controls a first air volume of air blown out from first outlet 31*a* and a second air volume of air blown out from each second outlet 32*a*. The air-volume control mechanism is provided between (i) air duct 22 and (ii) first ventilation path 31 and second ventilation path 32. In the present embodiment, the air-volume control mechanism is provided at a connection portion of air duct 22 and ventilation space K.

The air-volume control mechanism includes first damper 61 provided in a flow path between (i) blower 20 and (ii) first ventilation path 31 and second ventilation path 32. The present embodiment gives explanation using first damper 61 as an example of the air-volume control mechanism. In the present embodiment, flow paths indicate paths from inlet opening 21*a* of inlet duct 21 to first outlet 31*a*, second outlets 32*a*, and third outlets 33*a*.

As illustrated in FIG. 5A, first damper 61 includes first flap 61*b* that can be caused to rotate by air flowing through a flow path and shaft 61*a* that axially and rotatably supports first flap 61*b*. Shaft 61*a* extends in the Y-axis direction and can cause first flap 61*b* to freely rotate. Accordingly, first flap 61*b* can be readily caused to rotate by air flowing through air duct 22. In the present embodiment, shaft 61*a* is provided on the Z-axis positive side of first flap 61*b*, and first flap 61*b* is in a state of hanging from shaft 61*a* at a predetermined angle as illustrated in FIG. 5A.

As illustrated in FIG. 4, when first flap 61*b* and air-blow opening 22*a* that is a connection portion between air duct 22 and ventilation space K are viewed in the X-axis direction, first flap 61*b* is provided covering a portion of air-blow opening 22*a*.

For example, as illustrated in (a) of FIG. 8, when the flow rate of air flowing through air duct 22 is low, the air applies almost no force that causes first flap 61*b* to rotate, and thus first flap 61*b* lets the air flow into ventilation space K and leads the air to third ventilation paths 33. As illustrated in (a) of FIG. 9, first flap 61*b* lets the air flow into ventilation space K and leads the air also to second ventilation path 32. For example, as illustrated in (a) of FIG. 9, second ventilation path 32 is provided on the Y-axis positive and negative sides of first ventilation path 31. As illustrated in (a) of FIG. 8, second ventilation path 32 is provided closer to air duct 22 than the position of first flap 61*b* is to when air applies almost no force that causes first flap 61*b* to rotate. Accordingly, while the air is blown out from second outlets 32*a* and third outlets 33*a*, the air is also slightly blown out from first outlet 31*a*.

For example, as illustrated in (b) of FIG. 8, when the flow rate of air flowing through air duct 22 is high, air applies force that causes first flap 61*b* to greatly rotate, and thus the air flows into ventilation space K by causing first flap 61*b* to rotate. While much of the air is blown out from first outlet 31*a*, some of the air is blown out from second outlets 32*a* and third outlets 33*a*, as illustrated in (b) of FIG. 8 and (b) of FIG. 9.

With such a configuration, air blown out from first outlet 31*a* and second outlets 32*a* is blown out in the X axis positive direction. Accordingly, air blown out from first outlet 31*a* and second outlets 32*a* is blown onto the upper body (in particular, the head, the neck, and the shoulders) of a person seated against seat backrest 13.

Third ventilation paths 33 lead air that has reached ventilation space K to third outlets 33*a*. The air is blown out from third outlets 33*a* in the X-axis positive direction. Accordingly, the air blown out is blown onto a person (in particular, the back of the person) seated against seat backrest 13.

As illustrated in FIG. 2 and FIG. 3, controller 40 controls blower 20 and heat exchanger 34. Controller 40 is a microcomputer that allows and stops a flow of electric current through blower 20 and heat exchanger 34, controls output of blower 20 by changing the electric current value, uses heat exchanger 34 as a cooling device, and uses heat exchanger 34 as a heating device.

Controller 40 controls the air volume by controlling blower 20 to adjust the orientation of the air-volume control mechanism. Thus, controller 40 can control the air volumes of air blown out from first outlet 31*a*, each second outlet 32*a*, and each third outlet 33*a*, by controlling blower 20.

For example, controller 40 may control the air volume of air blown out from each of the outlets, by controlling blower 20 to adjust the orientation of the air-volume control mechanism, based on at least one of the temperature in a cabin in which seat 2 is provided, the temperature of a person present in the cabin, or a control instruction given to an air-conditioning device provided in a vehicle. In this case, controller 40 may obtain, from a sensor provided in the cabin, the temperature in the cabin and the temperature of a person present in the cabin, and control blower 20 and heat exchanger 34. Controller 40 may estimate the temperature in the cabin and the temperature of a person present in the cabin by obtaining an operation period from when the operation of the air-conditioning device provided in the vehicle starts, and control blower 20 and heat exchanger 34.

For example, controller 40 may keep the first air volume substantially zero during a predetermined period after the operation of seat air-conditioning device 1 starts, and may gradually increase the first air volume after the predetermined period elapses, by controlling blower 20 to adjust the orientation of the air-volume control mechanism. Specifically, as illustrated in FIG. 10, in a most initial cooling stage when the temperature adjustment by the air-conditioning device in the cabin has started, there is a case where the air-conditioning device in the cabin cannot blow cool air, and thus the first air volume is kept substantially zero until the predetermined period elapses after the operation of the air-conditioning device in the cabin has started. For example, when the temperature of air blown in the most initial cooling period is high such as summer, the ambient temperature in the cabin and thermal sensation of a person are high, and thus warm air can be prevented from being blown onto the person. After the most initial cooling stage has elapsed (after the predetermined period has elapsed), the air-conditioning device in the cabin can blow out cool air, and thus controller 40 may gradually increase the first air volume by controlling output of blower 20 in an initial cooling stage. The same applies to the case where the body of a person is to be warmed, not only when the body is to be cooled. Note that the most initial cooling stage lasts about several tens of seconds, whereas the initial cooling stage lasts about 5 minutes to 10 minutes. In addition, "substantially zero" herein may include a state where the flow rate of air is quite low.

For example, controller 40 may decrease a ratio of a first air volume to a second air volume as time elapses, by controlling blower 20 to adjust the orientation of the air-volume control mechanism, the first air volume being a volume of air blown out from first outlet 31*a*, the second air volume being a volume of air blown out from each second outlet 32*a*. Specifically, controller 40 may decrease the flow rate of air flowing through air duct 22 by decreasing output of blower 20 as time elapses. In this case, controller 40 controls the output of blower 20 to make the output smaller than the output in the initial cooling stage and greater than the output in the most initial cooling stage. As illustrated in FIG. 10, in a stable cooling stage in which the temperature in the cabin has become stable owing to the cooling effects achieved by the air-conditioning device in the cabin adjusting the temperature, the ambient temperature in the cabin and thermal sensation of a person are low. Accordingly, controller 40 increases the second air volume to cause air to be blown out widely, by controlling blower 20 to adjust the orientation of the air-volume control mechanism, and thus can cool the body of the person widely.

For example, controller 40 may make the air velocity of air blown out from first outlet 31*a* higher than the air velocity of air blown out from second outlets 32*a*, by controlling blower 20 to adjust the orientation of the air-volume control mechanism (first damper 61) to the one as illustrated in (b) of FIG. 8, in addition to making the opening of first ventilation path 31 that faces ventilation space K larger than the opening of second ventilation path 32. Specifically, a person feels hot in the initial cooling stage during summer, for instance, and thus controller 40 may control the flow rate of air that flows through air duct 22 by controlling the output of blower 20 to increase the flow rate of air that flows through air duct 22, as in the initial cooling stage illustrated in FIG. 10.

Furthermore, by controlling blower 20 to adjust the orientation of the air-volume control mechanism, controller 40 controls the first air volume of air blown out from first outlet 31*a*, the second air volume of air blown out from each second outlet 32*a*, and the third air volume of air blown out from each third outlet 33*a*, and controls the proportion of the third air volume relative to a sum total of the first air volume, the second air volume, and the third air volume.

For example, controller 40 keeps the first air volume substantially zero during the predetermined period. Specifically, controller 40 controls the output of blower 20 to cause the flow rate of air flowing through air duct 22 to be extremely low until the predetermined period elapses, as in the most initial cooling stage in FIG. 10. At this time, since a very small amount of air flows through air duct 22, the air applies almost no force that causes first flap 61*b* to rotate. Accordingly, air is mainly blown out from second outlets 32*a* and third outlets 33*a*.

For example, by controlling blower 20 to adjust the orientation of the air-volume control mechanism, controller 40 causes air to be blown out mainly from second outlets 32*a* and third outlets 33*a* and increases air to be blown out from first outlet 31*a* after the predetermined period elapses. Thus, controller 40 controls blower 20 as when the most initial cooling stage transitions to the initial cooling stage in FIG. 10. At this time, when the output of blower 20 is set to at least predetermined output, the air applies force that causes first flap 61*b* to rotate, and thus first flap 61*b* rotates to increase the proportion of the first air volume relative to the sum total of the first air volume, the second air volume, and the third air volume. In this case, the air causes first flap 61*b* to rotate so that the air volume of air blown out from first outlet 31*a* via ventilation space K increases, and at the same time, the air is blown out also from second outlets 32*a* and third outlets 33*a*.

For example, as illustrated in FIG. 3, (a) of FIG. 8, and (a) of FIG. 9, by controlling blower 20 to adjust the orientation of the air-volume control mechanism, controller 40 decreases the proportion of the first air volume relative to the sum total, and increases the proportion of the third air volume in conjunction with a decrease in the proportion of the first air volume. Specifically, controller 40 may decrease the flow rate of air flowing through air duct 22 by controlling the output of blower 20, as in the stable cooling stage in FIG. 10. At this time, air applies almost no force that causes first flap 61*b* to rotate. Accordingly, while the air is blown out from third outlets 33*a*, the air is also blown out from second outlets 32*a* and slightly blown out from first outlet 31*a*.

For example, as illustrated in FIG. 3, (b) of FIG. 8, and (b) of FIG. 9, controller 40 causes a sum of the first air volume and the second air volume to be greater than the third air volume, by controlling blower 20 to adjust the orientation of the air-volume control mechanism. Specifically, controller 40 may increase the flow rate of air flowing through air duct 22 by controlling the output of blower 20 to increase the air velocity of the air flowing through air duct 22. At this time, when the output of blower 20 is set to at least predetermined output, the air applies force that causes first flap 61*b* to rotate, and thus first flap 61*b* greatly rotates to increase the proportion of the first air volume relative to the sum total. In this case, the air causes first flap 61*b* to rotate so that much of the air is blown out from first outlet 31*a* via ventilation space K, and at the same time, some of the air is blown out also from second outlets 32*a* and third outlets 33*a*. In the present embodiment, first ventilation path 31 and air-blow opening 22*a* are aligned in a straight line. Accordingly, by controller 40 controlling blower 20 to adjust the orientation of the air-volume control mechanism, air having a first temperature is blown out from first outlet 31*a*, and air having a second temperature resulting from mixing the air having the first temperature and air in a cabin (air originally present in second ventilation path 32 and third ventilation paths 33) is blown out from second outlets 32*a*, third outlets 33*a*, or second outlets 32*a* and third outlets 33*a*.

Controller 40 may have a function of communicating with a controller of an air conditioner (hereinafter, referred to as air-conditioner controller) provided in a vehicle. In this case, controller 40 may transmit a control signal to the air-conditioner controller and receive an operating state of the air conditioner, to control blower 20 and heat exchanger 34.

Power supply 50 is a power source circuit that supplies power to blower 20 and heat exchanger 34. Here, power supply 50 is a direct current power source supplied with power from a battery not illustrated. Power supply 50 adjusts electric current supplied to blower 20 and heat exchanger 34 by being controlled by controller 40.

<Operational Effects>

Next, operational effects of seat air-conditioning device 1 according to the present embodiment are to be explained.

The vehicle seat air-conditioning device according to conventional technology has possibilities of an increase in manufacturing cost caused by an increase in the number of components due to an actuator and a wire harness, and an increase in total weight involved with the increase in the number of components. Furthermore, the vehicle seat air-conditioning device according to the conventional technology allows a person seated in a seat to switch between only two patterns of (i) the neck and therearound and (ii) the back, yet there is a demand to gain more comfortability.

In view of this, as described above, seat air-conditioning device 1 according to the present embodiment is seat air-conditioning device 1 for use in seat 2, seat air-conditioning device 1 including: blower 20 provided in seat 2; first ventilation path 31 that is provided in seat 2 and leads, to an upper body of a person seated in seat 2, air blown by blower 20 and to be blown out from first outlet 31*a*; second ventilation path 32 that is provided in seat 2 and leads, to the upper body of the person seated in seat 2, air blown by blower 20 and to be blown out from second outlet 32*a*; and an air-volume control mechanism that is provided in seat 2, and passively controls a first air volume of air blown out from first outlet 31*a* and a second air volume of air blown out from second outlet 32*a*.

According to this, while seat 2 includes blower 20, first ventilation path 31, and second ventilation path 32, the air-volume control mechanism can passively control the first air volume and the second air volume using air from blower 20, and can blow air onto the person seated in seat 2. Accordingly, in the present embodiment, the seat may not include an on-off valve or an actuator, for instance, for actively operating the on-off valve, as conventional technology requires.

By the air-volume control mechanism controlling the first air volume and the second air volume, the air volume of air blown out from first outlet 31*a* and the air volume of air blown out from each second outlet 32*a* can be made different from each other.

Thus, with seat air-conditioning device 1, an increase in manufacturing cost and an increase in entire weight can be reduced, and comfortability of a person seated in seat 2 can be further improved.

Seat air-conditioning device 1 according to the present embodiment includes controller 40 that controls operation of blower 20. Controller 40 controls the first air volume and the second air volume by controlling blower 20 to adjust an orientation of the air-volume control mechanism.

According to this, the orientation of the air-volume control mechanism can be adjusted according to the flow rate of air flowing in seat 2 by controlling the output of blower 20. Accordingly, the air velocity of air blown out from first outlet 31*a* and the air velocity of air blown out from each second outlet 32*a* can be made different from each other by controller 40 controlling output of blower 20. Further, comfortability of a person seated in seat 2 can be further improved.

In seat air-conditioning device 1 according to the present embodiment, controller 40 decreases a ratio of the first air volume to the second air volume as time elapses, by controlling blower 20 to adjust the orientation of the air-volume control mechanism.

According to this, as illustrated in FIG. 10, for example, in the stable cooling stage in which the temperature in the cabin is stable owing to cooling effects achieved by temperature adjustment by the air-conditioning device in the cabin, the second air volume is increased by controller 40 controlling output of blower 20 to widely blow air so that the body of the person can be widely cooled. The same applies to the case where the body of a person is to be warmed, in addition to the case where the body is to be cooled.

In seat air-conditioning device 1 according to the present embodiment, controller 40 controls the first air volume and the second air volume by controlling blower 20 to adjust the orientation of the air-volume control mechanism, based on at least one of a temperature in a cabin in which seat 2 is provided, a temperature of a person present in the cabin, or a control instruction given to an air-conditioning device provided in a vehicle.

According to this, the orientation of the air-volume control mechanism can be automatically adjusted by controller 40 controlling the output of blower 20. Since the first air volume and the second air volume can be automatically controlled by automatically adjusting the orientation of the air-volume control mechanism, an actuator for adjusting the orientation of the air-volume control mechanism does not need to be used in seat air-conditioning device 1 according to the present embodiment. Hence, according to seat air-conditioning device 1, an increase in manufacturing cost and an increase in total weight can be reduced.

In seat air-conditioning device 1 according to the present embodiment, controller 40 causes an air velocity of air blown out from first outlet 31*a* to be higher than an air velocity of air blown out from second outlet 32*a*, by controlling blower 20 to adjust the orientation of the air-volume control mechanism.

According to this, the orientation of the air-volume control mechanism can be automatically adjusted by controller 40 controlling the output of blower 20. Since the first air velocity and the second air velocity can be automatically controlled by automatically adjusting the orientation of the air-volume control mechanism, an actuator for adjusting the orientation of the air-volume control mechanism does not need to be used in seat air-conditioning device 1 according to the present embodiment. Hence, according to seat air-conditioning device 1, an increase in manufacturing cost and an increase in total weight can be reduced.

In seat air-conditioning device 1 according to the present embodiment, by controlling blower 20 to adjust the orientation of the air-volume control mechanism, controller 40: keeps the first air volume substantially zero during a predetermined period from when operation of seat air-conditioning device 1 starts; and gradually increases the first air volume after the predetermined period elapses.

According to this, for example, as illustrated in FIG. 10, in the most initial cooling stage when the temperature adjustment by the air-conditioning device in the cabin has started, there is a case where the air-conditioning device in the cabin cannot blow out cool air, and thus the first air volume is kept substantially zero until the predetermined period elapses after the operation of the air-conditioning device in the cabin has started. Accordingly, warm air can be prevented from directly being blown onto a person from first outlet 31*a*, and thus discomfort can be prevented from being given to the person.

After the most initial cooling stage has elapsed (after the predetermined period has elapsed), the air-conditioning device in the cabin can blow cool air, and thus cool air can be locally blown onto a person by controller 40 controlling output of blower 20 in the initial cooling stage to increase the first air volume. Accordingly, the body of the person can be locally cooled. The same applies to the case where the body of a person is to be warmed, in addition to the case where the body is to be cooled.

Seat air-conditioning device 1 according to the present embodiment further includes: plural third ventilation paths 33 that are provided in seat 2 and lead, to the person seated in seat 2, air blown by blower 20 and to be blown out from plural third outlets 33*a*.

According to this, since air can be blown out also from third outlets 33*a*, the body of the person can be cooled and warmed.

In seat air-conditioning device 1 according to the present embodiment, by controlling blower 20 to adjust the orientation of the air-volume control mechanism, controller 40: controls the first air volume of air blown out from first outlet 31*a*, the second air volume of air blown out from second outlet 32*a*, and a third air volume of air blown out from each of plural third outlets 33*a*; and controls a proportion of the third air volume relative to a sum total of the first air volume, the second air volume, and the third air volume.

According to this, the orientation of the air-volume control mechanism can be automatically adjusted by controller 40 controlling the output of blower 20. The first air volume, the second air volume, and the third air volume can be automatically controlled by the orientation of the air-volume control mechanism being automatically adjusted. Accordingly, the proportion of the third air volume can be controlled by making the air volume of air blown out from first outlet 31*a*, the air volume of air blown out from each second outlet 32*a*, and the air volume of air blown out from each third outlet 33*a* different from one another.

In seat air-conditioning device 1 according to the present embodiment, controller 40 decreases a proportion of the first air volume relative to the sum total and increases the proportion of the third air volume in conjunction with a decrease in the proportion of the first air volume, by controlling blower 20 to adjust the orientation of the air-volume control mechanism.

According to this, for example, in the stable cooling stage in which the temperature in the cabin is stable, the third air volume is increased by controller 40 controlling output of blower 20 to widely blow air so that the body of the person can be widely cooled. The same applies to the case where the body of a person is to be warmed, in addition to the case where the body is to be cooled.

In seat air-conditioning device 1 according to the present embodiment, controller 40 causes a sum of the first air volume and the second air volume to be greater than the third air volume, by controlling blower 20 to adjust the orientation of the air-volume control mechanism.

According to this, for example, in the initial cooling stage in which the temperature in the cabin is not stable, the first air volume and the second air volume are increased by controller 40 controlling output of blower 20 so that the body of the person can be cooled. The same applies to the case where the body of a person is to be warmed, in addition to the case where the body is to be cooled.

In seat air-conditioning device 1 according to the present embodiment, by controlling blower 20 to adjust the orientation of the air-volume control mechanism, controller 40: causes air to be blown out from second outlet 32*a* and plural third outlets 33*a*; and increases air blown out from first outlet 31*a* after a predetermined period elapses.

According to this, for example, in the most initial cooling stage in which the temperature in the cabin is not stable, warm air can be prevented from being locally blown onto, for instance, the neck of a person sensitive to thermal sensation, by controller 40 controlling output of blower 20 to cause mostly air to be blown out from second outlets 32*a* and third outlets 33*a*. After the stage transitions from the most initial cooling stage to the initial cooling stage, the body of the person can be cooled by controller 40 controlling output of blower 20 to increase the first air volume. The same applies to the case where the body of a person is to be warmed, in addition to the case where the body is to be cooled.

In seat air-conditioning device 1 according to the present embodiment, the air-volume control mechanism includes first damper 61 provided in a flow path between first ventilation path 31 and blower 20, and first damper 61 includes first flap 61*b* caused to rotate by air flowing through the flow path.

According to this, first flap 61*b* is caused to rotate by air from blower 20, and thus the orientation of first flap 61*b* is automatically adjusted. Accordingly, an actuator for adjusting the orientation of the air-volume control mechanism does not need to be used in seat air-conditioning device 1 according to the present embodiment. As a result, according to seat air-conditioning device 1, an increase in manufacturing cost and an increase in total weight can be reduced.

In seat air-conditioning device 1 according to the present embodiment, the air-volume control mechanism includes first damper 61 provided in a flow path between first ventilation path 31 and blower 20. First damper 61 includes first flap 61*b* caused to rotate by air flowing through the flow path. First flap 61*b* rotates to increase a proportion of the first air volume relative to the sum total, when output of blower 20 is set to at least predetermined output.

According to this, the orientation of first flap 61*b* can be adjusted using air from blower 20 to increase the proportion of the first air volume. Accordingly, an actuator for adjusting the orientation of the air-volume control mechanism does not need to be used in seat air-conditioning device 1 according to the present embodiment. As a result, according to seat air-conditioning device 1, an increase in manufacturing cost and an increase in total weight can be reduced.

In seat air-conditioning device 1 according to the present embodiment, the air-volume control mechanism includes first damper 61 provided in a flow path between first ventilation path 31 and blower 20. First damper 61 includes first flap 61*b* that is caused to rotate by air flowing through the flow path. First flap 61*b* rotates to increase the proportion of the third air volume relative to the sum total.

According to this, the orientation of first flap 61*b* can be adjusted using air from blower 20 to increase the proportion of the third air volume. Accordingly, an actuator for adjusting the orientation of the air-volume control mechanism does not need to be used in seat air-conditioning device 1 according to the present embodiment. As a result, according to seat air-conditioning device 1, an increase in manufacturing cost and an increase in total weight can be reduced.

In seat air-conditioning device 1 according to the present embodiment, a length of first ventilation path 31 is shorter than a length of second ventilation path 32.

According to this, the air velocity of air blown out from first outlet 31*a* of first ventilation path 31 can be made greater than the air velocity of air blown out from each second outlet 32*a* of second ventilation path 32.

In seat air-conditioning device 1 according to the present embodiment, controller 40 causes air having a first temperature to be blown out from first outlet 31*a* and causes air having a second temperature to be blown out from (i) second outlet 32*a*, (ii) plural third outlets 33*a*, or (iii) second outlet 32*a* and plural third outlets 33*a*, by controlling blower 20 to adjust the orientation of the air-volume control mechanism, the air having the second temperature resulting from mixing the air having the first temperature and air in a cabin.

According to this, the body of a person can be locally cooled and warmed by blowing out air having the first temperature from first outlet 31*a* to the person. Furthermore, the body of the person can be widely and mildly cooled and warmed by blowing out air having the second temperature closer to the temperature in the cabin than the first temperature is to from second outlets 32*a*, third outlets 33*a*, or second outlets 32*a* and third outlets 33*a*.

In seat air-conditioning device 1 according to the present embodiment, an opening area of first outlet 31*a* is smaller than an opening area of second outlet 32*a*.

Accordingly, since the opening area of first outlet 31*a* is smaller than the opening area of each second outlet 32*a*, the air velocity of air blown out from first outlet 31*a* and the air velocity of air blown out from each second outlet 32*a* can be made different by controlling the output of blower 20.

In seat air-conditioning device 1 according to the present embodiment, a branch space (ventilation space K) into which air blown by blower 20 flows via air-blow opening 22*a* is provided in seat 2. First ventilation path 31 and second ventilation path 32 are connected to the branch space (ventilation space K). First ventilation path 31 and air-blow opening 22*a* are aligned in a straight line. Second ventilation path 32 branches and extends from the branch space (ventilation space K) at a position distant from first ventilation path 31.

According to this, air flowing from air-blow opening 22*a* into ventilation space K readily flows into first ventilation path 31, and thus the air velocity of air blown out from first outlet 31*a* is less likely to be decreased. Accordingly, air having a small air velocity distribution range and having a high flow velocity can be blown out from first outlet 31*a*. Second ventilation path 32 branches from ventilation space K, and thus when air flowing into ventilation space K flows into first ventilation path 31, the flow velocity is readily decreased. Accordingly, air having a wider air velocity distribution range and having a lower flow velocity than those of air blown out from first outlet 31*a* can be blown out from each second outlet 32*a*.

Variation 1 of Embodiment 1

First, seat air-conditioning device 1*a* according to this variation is to be explained with reference to FIG. 11 to FIG. 13.

Figure 11:
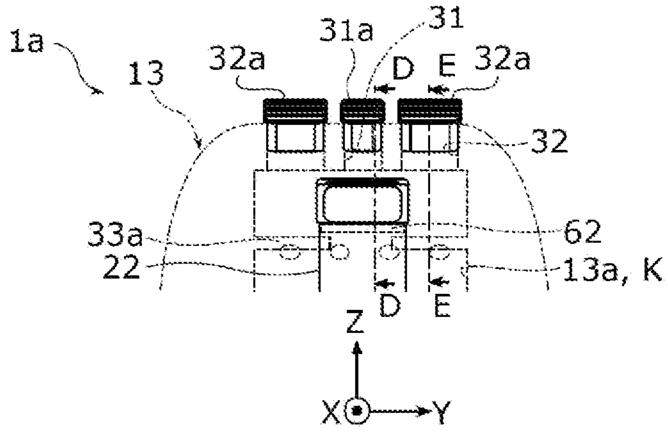
FIG. 11 is a front view of an enlarged portion of a seat air-conditioning device according to Variation 1 of Embodiment 1.
Figure 12A:
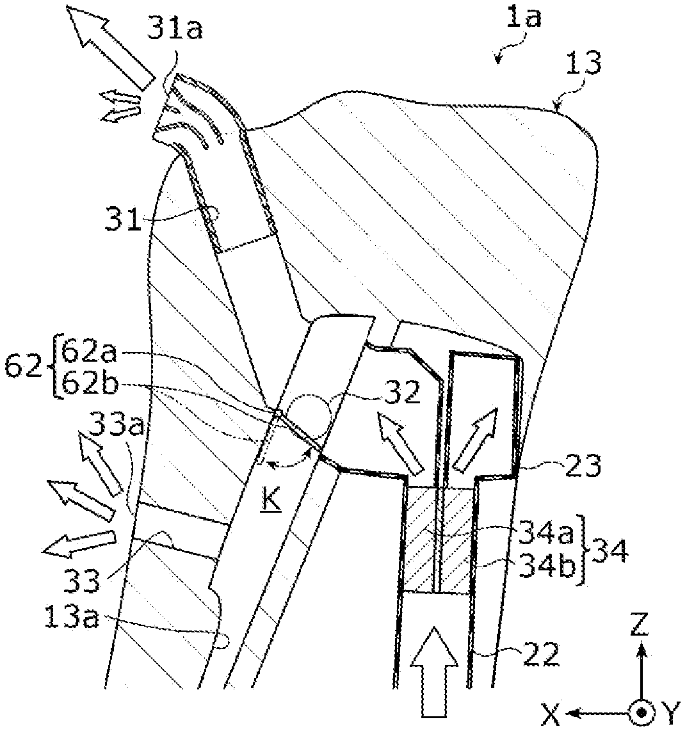
FIG. 12A is a cross sectional view of the seat air-conditioning device according to Variation 1 of Embodiment 1, which is taken along line D-D in FIG. 11.
Figure 12B:
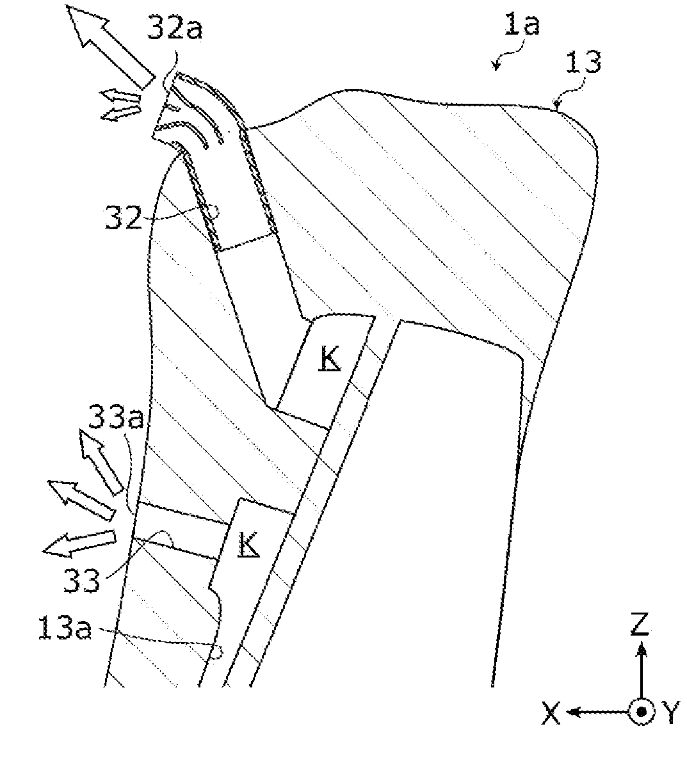
FIG. 12B is a cross sectional view of the seat air-conditioning device according to Variation 1 of Embodiment 1, which is taken along line E-E in FIG. 11.

FIG. 11 is a front view of an enlarged portion of seat air-conditioning device 1*a* according to Variation 1 of Embodiment 1. FIG. 12A is a cross sectional view of seat air-conditioning device 1*a* according to Variation 1 of Embodiment 1, which is taken along line D-D in FIG. 11. FIG. 12B is a cross sectional view of seat air-conditioning device 1*a* according to Variation 1 of Embodiment 1, which is taken along line E-E in FIG. 11. FIG. 13 shows cross-sectional views of an enlarged portion showing movement of second flap 62*b* according to the flow rate of air flowing through air duct 22 and flows of air, in Variation 1 of Embodiment 1.

This variation differs from the seat air-conditioning device according to Embodiment 1 in that the air-volume control mechanism includes, instead of the first damper, second damper 62 provided below the first damper. Other structural elements in this variation are similar to those in Embodiment 1 unless otherwise stated in particular, and the same elements and functions are given with the same signs, so detailed explanations regarding the elements and functions are omitted.

Figure 13:
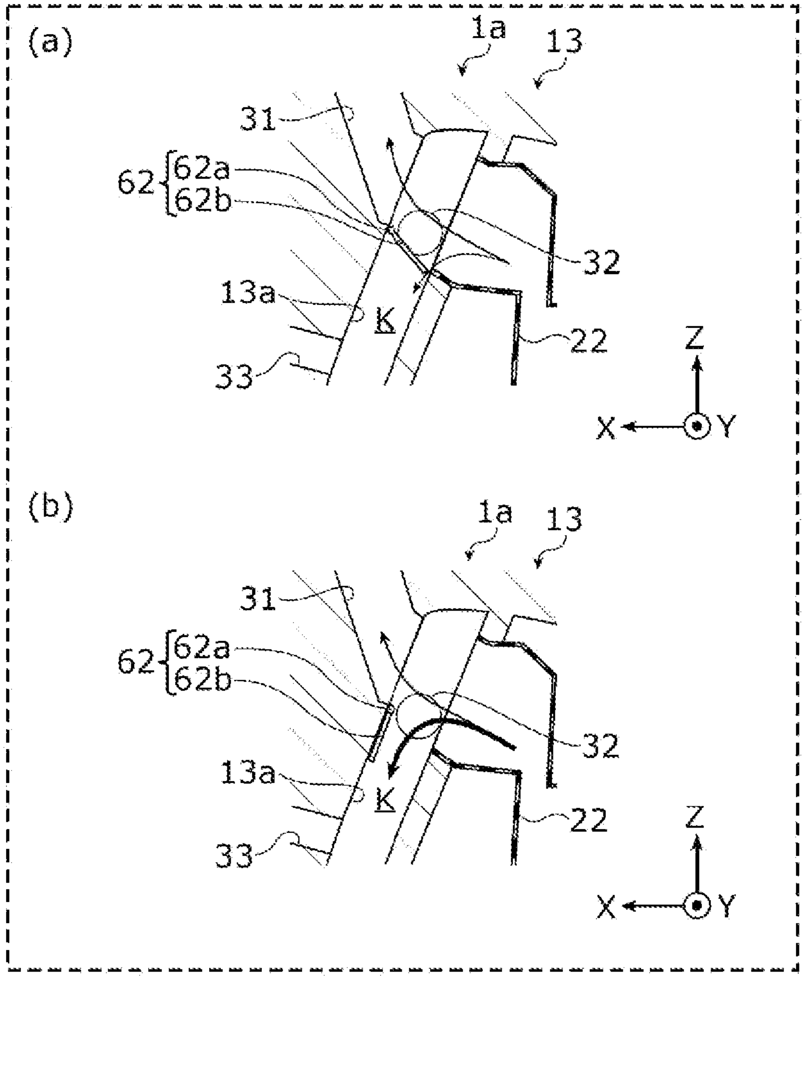
FIG. 13 shows cross-sectional views of an enlarged portion showing movement of a second flap according to the flow rate of air flowing through the air duct and flows of air, in Variation 1 of Embodiment 1.

In this variation, as illustrated in FIG. 11 to FIG. 13, the air-volume control mechanism includes second damper 62 provided in ventilation space K that is a branch space connected to first ventilation path 31 and third ventilation paths 33.

Second damper 62 includes second flap 62*b* that can be caused to rotate by air flowing through a flow path and shaft 62*a* that axially and rotatably supports second flap 62*b*. Shaft 62*a* extends in the Y-axis direction and can cause second flap 62*b* to freely rotate. Accordingly, second flap 62*b* can be readily caused to rotate by air flowing through air duct 22. In this variation, in a state in which blower 20 is not operating, shaft 62*a* is on the X-axis positive side of second flap 62*b*.

Second flap 62*b* is provided in ventilation space K to prevent air from flowing from air-blow opening 22*a* to third ventilation paths 33. As illustrated in FIG. 12A and (b) of FIG. 13, if the flow rate of air that flows into ventilation space K increases, air is blown out from third outlets 33*a* of third ventilation paths 33 by second flap 62*b* rotating.

As illustrated in FIG. 12A and (a) of FIG. 13, when the flow rate of air that flows into ventilation space K is extremely low, the air applies almost no force that causes second flap 62*b* to rotate, and thus air is blown out from first outlet 31*a* of first ventilation path 31 and second outlets 32*a* of second ventilation path 32, and a very small amount of air that flows into from the gap between second flap 62*b* and seat backrest 13 is blown out from third outlets 33*a* of third ventilation paths 33.

As described above, in seat air-conditioning device 1*a* according to this variation, the air-volume control mechanism includes second damper 62 provided in the branch space (ventilation space K) connected to first ventilation path 31 and third ventilation paths 33. Second damper 62 includes second flap 62*b* that can be caused to rotate by air flowing in the branch space (ventilation space K).

According to this, second flap 62*b* is caused to rotate by air from blower 20, and thus the orientation of second flap 62*b* is automatically adjusted. Accordingly, an actuator for adjusting the orientation of the air-volume control mechanism does not need to be used in seat air-conditioning device 1*a* according to this variation. As a result, according to seat air-conditioning device 1*a*, an increase in manufacturing cost and an increase in total weight can be reduced.

Variation 2 of Embodiment 1

Seat air-conditioning device 1*b* according to this variation is to be explained with reference to FIG. 14A to FIG. 14D.

Figure 14A:
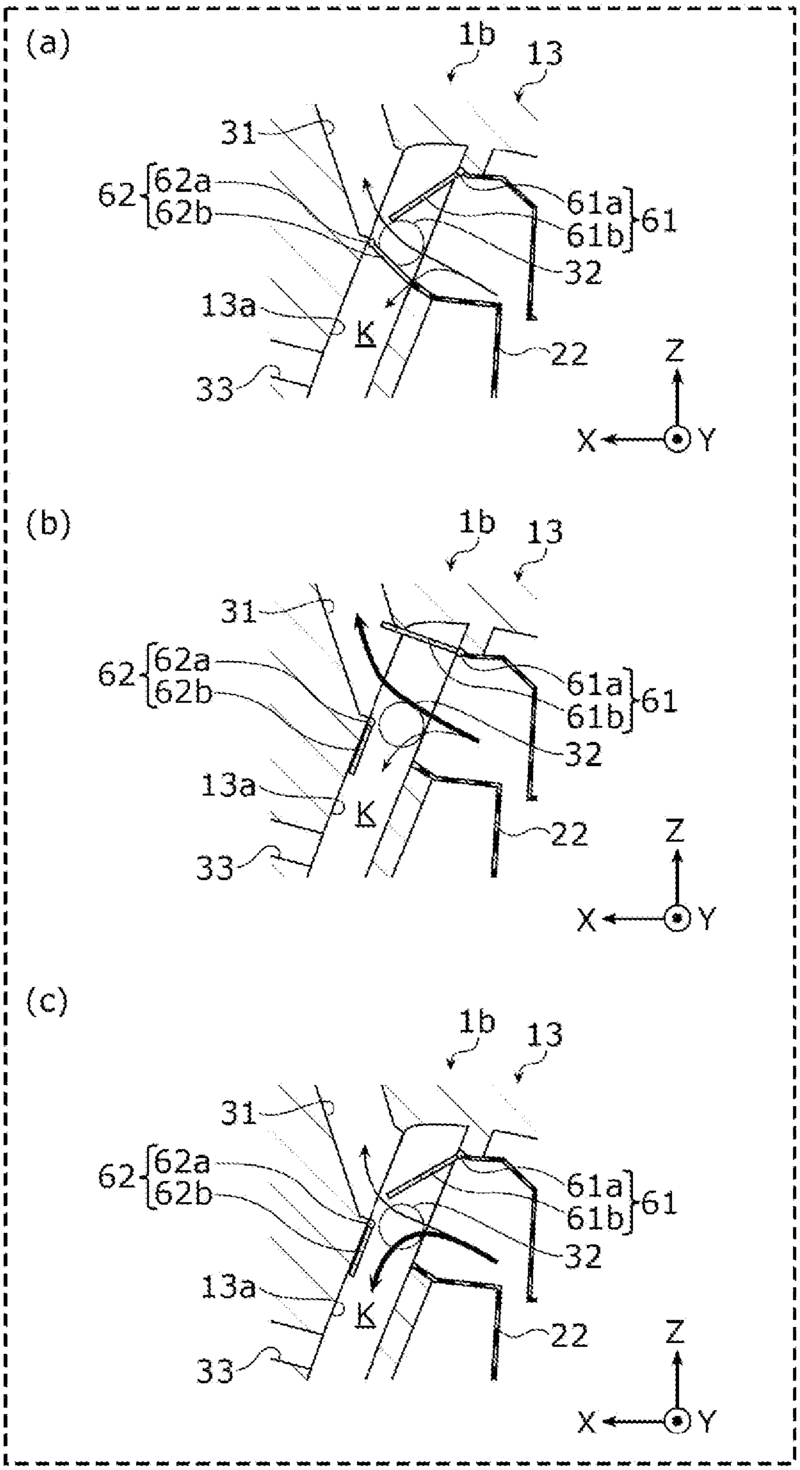
FIG. 14A shows cross-sectional views of an enlarged portion showing movement of the first flap and the second flap according to the flow rate of air flowing through the air duct and flows of air, in Variation 2 of Embodiment 1.
Figure 14B:
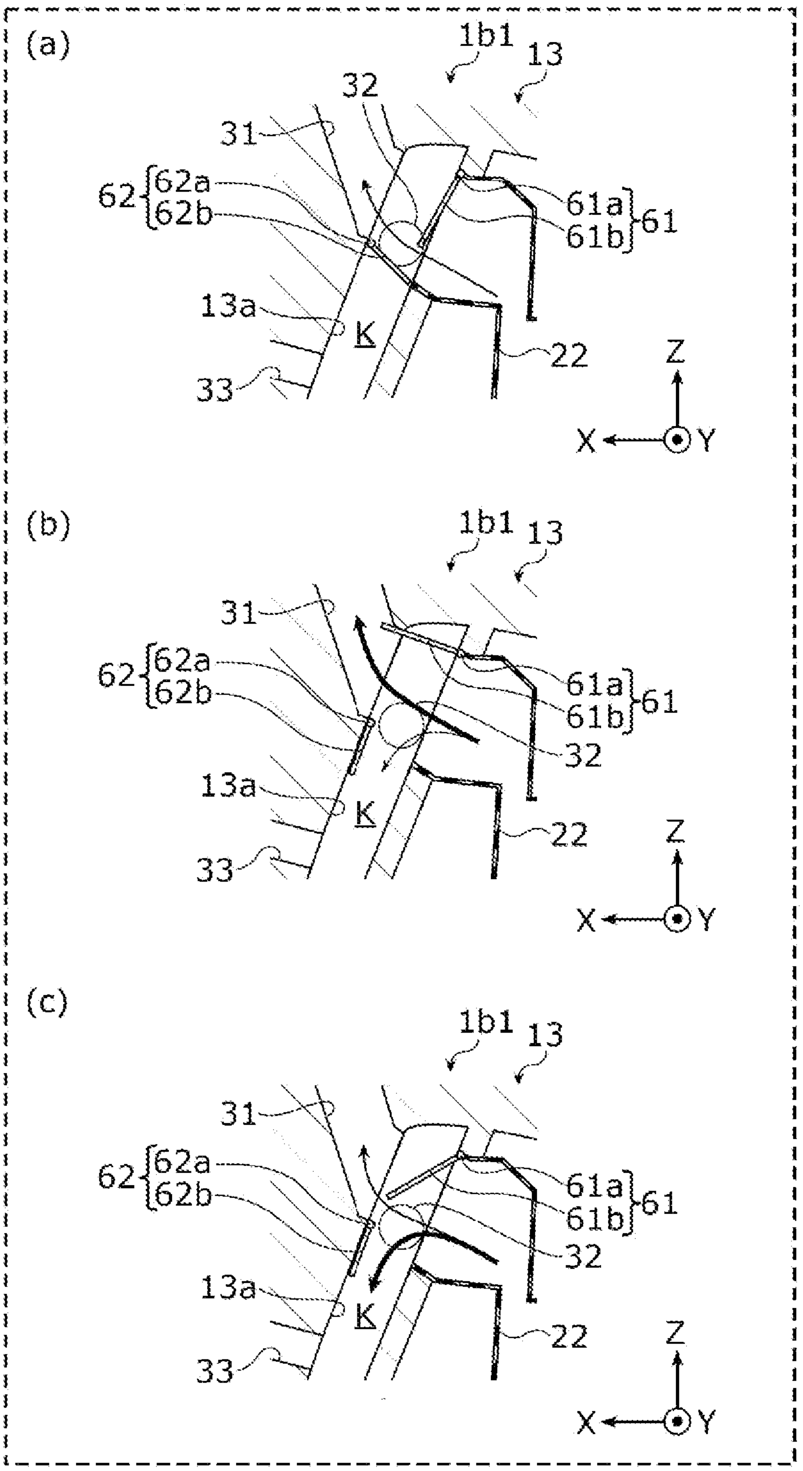
FIG. 14B shows cross-sectional views of an enlarged portion showing movement of the first flap and the second flap according to the flow rate of air flowing through the air duct and flows of air, when additional controls are performed.
Figure 14C:
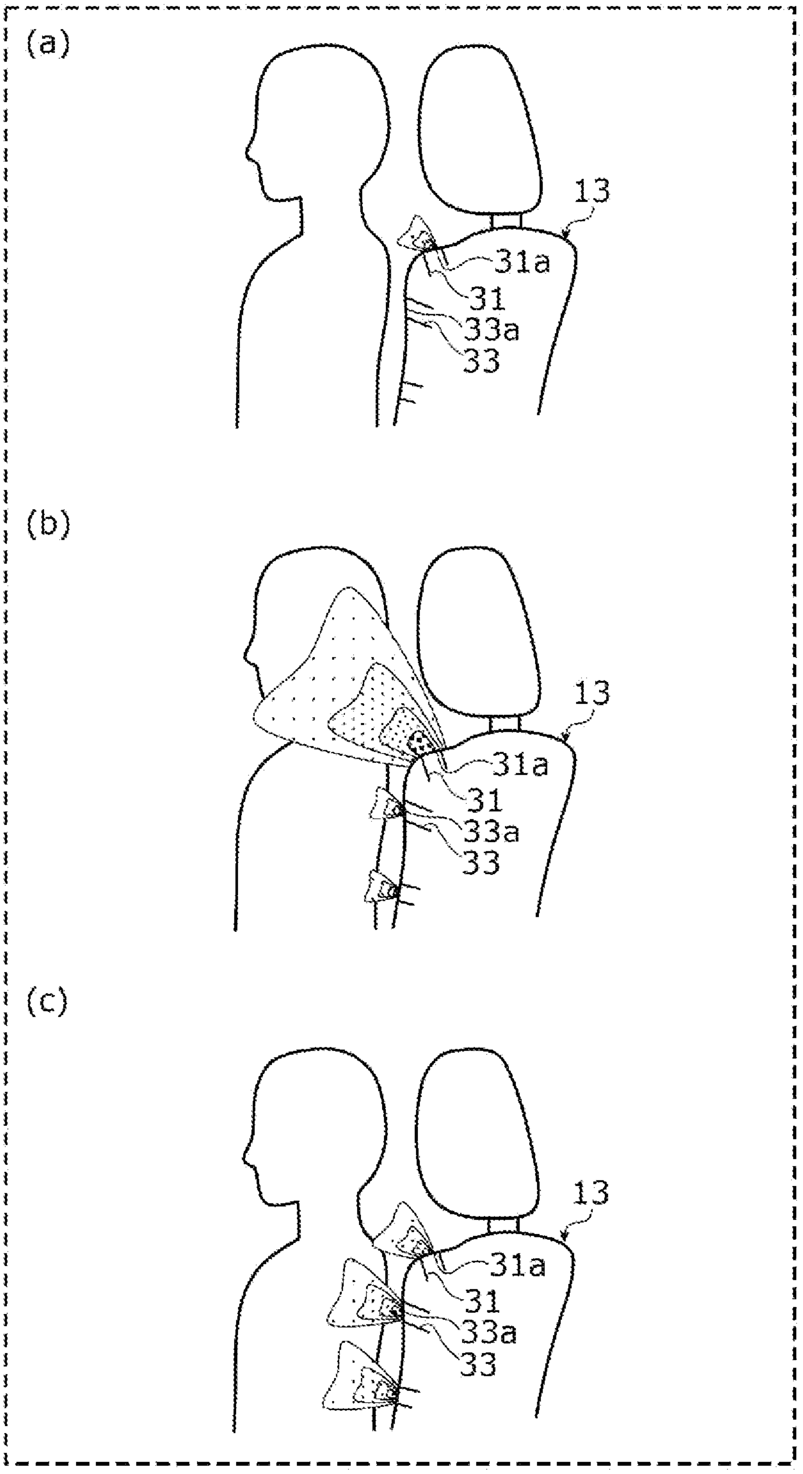
FIG. 14C illustrates ranges of air velocity distribution of air blown out from the first outlet and third outlets when the seat backrest is viewed laterally.
Figure 14D:
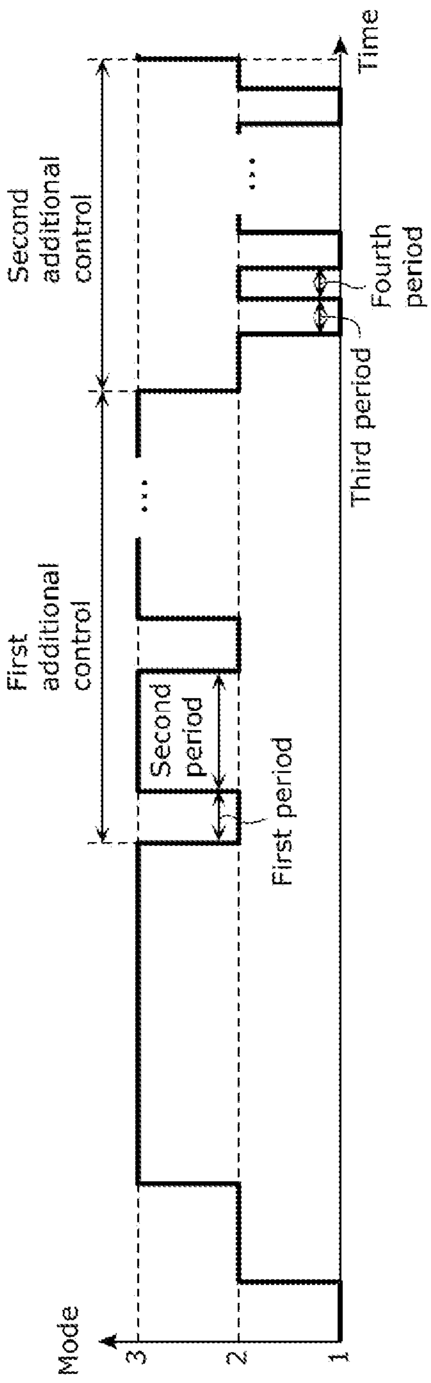
FIG. 14D illustrates the case where one or more additional controls are performed after modes are executed.

FIG. 14A shows cross-sectional views of an enlarged portion showing movement of first flap 61*b* and second flap 62*b* according to the flow rate of air flowing through air duct 22 and flows of air, in Variation 2 of Embodiment 1. FIG. 14B shows cross-sectional views of an enlarged portion showing movement of first flap 61*b* and second flap 62*b* according to the flow rate of air flowing through air duct 22 and flows of air, when additional controls are performed. FIG. 14C illustrates ranges of air velocity distribution of air blown out from first outlet 31*a* and third outlets 33*a* when seat backrest 13 is viewed laterally. FIG. 14D illustrates the case where one or more additional controls are performed after modes are executed.

In this variation, a difference from the seat air-conditioning device according to Variation 1 of Embodiment 1 is that the air-volume control mechanism includes first damper 61 and second damper 62. Other structural elements in this variation are similar to those in Variation 1 of Embodiment 1 unless otherwise stated in particular, and the same elements and functions are given with the same signs, so detailed explanations regarding the elements and functions are omitted.

First damper 61 of the air-volume control mechanism in this variation has the same configuration as that of Embodiment 1, whereas second damper 62 of the air-volume control mechanism in this variation has the same configuration as that of Variation 1 of Embodiment 1.

In this variation, when the air-volume control mechanism includes first damper 61 and second damper 62, seat air-conditioning device 1*b* performs operation as follows.

As illustrated in (a) of FIG. 14A, when controller 40 controls the output of blower 20 to make the flow rate of air flowing through air duct 22 extremely low, air applies almost no force that causes first flap 61*b* to rotate, and furthermore, the flow rate of air that flows into ventilation space K is extremely low, so that air applies almost no force that causes second flap 62*b* to rotate. Accordingly, air is blown out from second outlets 32*a* of second ventilation path 32. A very small amount of air that has flown into from the gap defined by first flap 61*b* is blown out from first outlet 31*a* of first ventilation path 31, and a very small amount of air that has flown into from the gap between second flap 62*b* and seat backrest 13 is blown out from third outlets 33*a* of third ventilation paths 33.

As illustrated in (b) of FIG. 14A, when controller 40 increases the flow rate of air flowing through air duct 22 by controlling the output of blower 20, the air applies force that causes first flap 61*b* to rotate, and thus causes first flap 61*b* to rotate. Further, a high flow rate of air flows into ventilation space K, so that the air applies force that causes second flap 62*b* to rotate, and thus causes second flap 62*b* to rotate. Accordingly, mainly, a greater amount of air is blown out from first outlet 31*a* of first ventilation path 31, and subsequently air is blown out from second outlets 32*a* of second ventilation path 32. The air that has flown in from second flap 62*b* is also blown out from third outlets 33*a* of third ventilation paths 33.

As illustrated in (c) of FIG. 14A, when controller 40 decreases the flow rate of air flowing through air duct 22 by controlling the output of blower 20, the air applies almost no force that causes first flap 61*b* to rotate. Further, although a low flow rate of air flows into ventilation space K, the air applies force that causes second flap 62*b* to rotate, and thus causes second flap 62*b* to rotate. Thus, the flow rate of air that completely opens second flap 62*b* is less than the flow rate of air that completely opens first flap 61*b*. Accordingly, since the air is led to first flap 61*b*, the air is blown out from second outlets 32*a* and third outlets 33*a*, and at the same time, some of the air is also blown out from first outlet 31*a*.

As illustrated in FIG. 14B, controller 40 of seat air-conditioning device 1*b*1 according to this variation has a timer function to count a continuous use period from the start of operating blower 20. Controller 40 performs one or more additional controls for controlling blower 20, based on the continuous use period counted.

Specifically, controller 40 has a first mode, a second mode, and a third mode.

As illustrated in (a) of FIG. 14B and (a) of FIG. 14C, the first mode is a mode which is executed in, for example, the most initial cooling stage, and in which a very small amount of air is blown out from first outlet 31*a* and second outlets 32*a*. In the first mode, controller 40 controls blower 20 to cause air to apply force that causes first flap 61*b* to slightly rotate. In the first mode, air applies almost no force that causes second flap 62*b* to rotate, so that air is not blown out from third outlets 33*a* of third ventilation paths 33.

As illustrated in (b) of FIG. 14B and (b) of FIG. 14C, the second mode is a mode which is executed in, for example, the initial cooling stage after the most initial cooling stage has elapsed, and in which a great amount of air is blown out from first outlet 31*a*, subsequently air is blown out from second outlets 32*a*, and also a very small amount of air is blown out from third outlets 33*a*. In the second mode, controller 40 controls blower 20 to cause air to apply force that completely open first flap 61*b* and second flap 62*b*.

As illustrated in (c) of FIG. 14B and (c) of FIG. 14C, the third mode is a mode which is executed in, for example, the stable cooling stage, and in which air is blown out from second outlets 32*a* and third outlets 33*a*, and also some of the air is blown out from first outlet 31*a*. In the third mode, controller 40 controls blower 20 to cause air to apply force that causes first flap 61*b* to slightly rotate and to apply force that completely opens second flap 62*b*.

When controller 40 executes the first mode, the second mode, and the third mode in this order, controller 40 performs one or more additional controls for controlling blower 20, based on the continuous use period counted or a state of a person. For example, controller 40 switches between the modes by performing the one or more additional controls, based on the state of a person obtained from a driver monitor system and a wearable sensor, for instance. When the continuous use period exceeds a predetermined period, controller 40 may switch between the modes by performing one or more additional controls, and after the continuous use period has exceeded the predetermined period, controller 40 may switch between the modes by performing one or more additional controls, based on the state of a person obtained from the driver monitor system and the wearable sensor, for instance.

In the one or more additional controls, controller 40 switches between the modes. For example, controller 40 switches between the first mode and the second mode, and switches between the second mode and the third mode In FIG. 14D, as a first additional control, controller 40 repeats the following more than once: switching from the third mode to the second mode and executing the second mode for a first period, and thereafter switching from the second mode to the third mode and executing the third mode for a second period. Accordingly, in the stable cooling stage, by alternately executing the second mode and the third mode, a person can be prevented from feeling less cold sensation by getting used to. The first additional control is included in the one or more additional controls stated above.

In the first additional control, controller 40 switches between the second mode and the third mode, but may periodically switch between the modes or randomly switch between the modes. Controller 40 may control blower 20 to reproduce 1/f fluctuation when the modes are randomly switched.

When a person drives a vehicle for a long time, controller 40 may perform a second additional control after the first additional control. The second additional control is included in the one or more additional controls stated above. Specifically, as the second additional control, controller 40 repeats the following more than once: switching from the second mode to the first mode and executing the first mode for a third period, and thereafter switching from the first mode to the second mode and executing the second mode for a fourth period. Accordingly, in the stable cooling stage, the air volume of air blown onto a person can be greatly changed by alternately executing the first mode and the second mode, and thus a stimulus can be given to the person. In particular, when the person is a driver, a stimulus can be given to the driver, and thus concentration of the driver can be expected to be maintained.

In the first additional control stated above, a cycle which includes the first period and the second period and in which the modes are switched is longer than a cycle which includes the third period and the fourth period and in which the modes are switched in the second additional control. The first additional control is less likely to give a stimulus that could cause a person to have an odd feeling or discomfort, but nevertheless, the air volume of air blown onto a person can be more finely changed in the second additional control than in the first additional control, and a stimulus is more likely to be given to a person in the second additional control than in the first additional control.

In the second additional control, controller 40 switches between the first mode and the second mode, but may periodically switch between the modes or randomly switch between the modes.

Further, controller 40 may switch between the modes in the one or more additional controls stated above, based on the state of a person obtained from the driver monitor system and the wearable sensor, for instance.

Note that in the above, the first additional control and the second additional control are performed after the control in the most initial cooling stage to the control in the stable cooling stage are performed, yet this variation is not limited thereto. For example, after performing control in the most initial cooling stage to control in the stable cooling stage, at least one of the first additional control or the second additional control may be simply performed or the first additional control and the second additional control may be repeatedly performed. Further, after performing the operation in the initial cooling stage to the operation in the stable cooling stage without performing control in the most initial cooling stage, at least one of the first additional control or the second additional control may be simply performed or the first additional control and the second additional control may be repeatedly performed. Further, after performing the operation in the stable cooling stage without performing control in the most initial cooling stage and control in the initial cooling stage, at least one of the first additional control or the second additional control may be simply performed or the first additional control and the second additional control may be repeatedly performed.

For example, when only the first additional control is performed after performing the control in the most initial cooling stage to the control in the stable cooling stage is assumed to be the case in which a person does not drive a vehicle for a long time, such as when the vehicle has reached its destination while performing the first additional control.

For example, when only the second additional control is performed after performing the control in the most initial cooling stage to the control in the stable cooling stage is assumed to be the case in which the state of a person obtained from the driver monitor system and the wearable sensor, for instance, during the most initial cooling stage to the stable cooling stage is at a low awakening level.

For example, when the second additional control and the first additional control are successively performed after performing the control in the most initial cooling stage to the control in the stable cooling stage is assumed to be the case in which the state of a person obtained from the driver monitor system and the wearable sensor, for instance, is at a low awakening level, and thus the person is awakened by performing the second additional control to give a stimulus, and thereafter the first additional control is performed.

For example, when the first additional control and the second additional control are successively performed after performing the control in the most initial cooling stage to the control in the stable cooling stage is assumed to be the case in which a person drives a vehicle for a long time and the case in which the state of a person obtained from the driver monitor system and the wearable sensor, for instance, is at a low awakening level when the first additional control is performed, and thus the person is awakened by performing the second additional control to give a stimulus to the person.

Note that the driver monitor system and the wearable sensor may be included in the structural elements of seat air-conditioning device 1*b*1.

As described above, in seat air-conditioning device 1*b*1 according to this variation, the air-volume control mechanism includes first damper 61 provided in a flow path between first ventilation path 31 and blower 20. First damper 61 includes first flap 61*b* that can be caused to rotate by air flowing through the flow path. The air-volume control mechanism includes second damper 62 provided in a branch space (ventilation space K) connected to first ventilation path 31 and third ventilation paths 33. Second damper 62 includes second flap 62*b* that can be caused to rotate by air flowing in the branch space (ventilation space K). Controller 40 adjusts the orientation of first flap 61*b* and the orientation of second flap 62*b* by controlling output of blower 20.

According to this, the orientation of first flap 61*b* and the orientation of second flap 62*b* can be automatically adjusted by air from blower 20. Accordingly, the air volumes of air blown out from the outlets can be controlled by controller 40 controlling the output of blower 20.

In seat air-conditioning device 1*b*1 according to this variation, controller 40 has the first mode executed in the most initial cooling stage, the second mode executed in the initial cooling stage, which is subsequent to the first mode, and the third mode executed in the stable cooling stage, which is subsequent to the second mode. Controller 40 counts a continuous use period from the point in time at which the operation of blower 20 starts or obtains the state of a person. Controller 40 performs one or more additional controls for controlling blower 20, based on the continuous use period or the state of the person. Controller 40 performs at least one of (1) controlling blower 20 to switch between the second mode and the third mode when the first additional control included in the one or more additional controls is performed or (2) controlling blower 20 to switch between the first mode and the second mode when the second additional control included in the one or more additional controls is performed.

According to this, for example, when a person drives a vehicle for a long time, by performing the first additional control to switch between the third mode and the second mode after the stable cooling stage, a decrease in cold sensation of the person due to getting used to can be reduced. Accordingly, comfortability of a person present in the cabin can be expected to be maintained for a long time.

As the second additional control, the air volume of air to be blown onto a person can be greatly changed by switching between the first mode and the second mode, and thus a stimulus can be given to the person. Accordingly, concentration of the driver can be expected to be maintained.

In seat air-conditioning device 1*b*1 according to this variation, a cycle which includes a first period and a second period and in which the modes are switched in the first additional control included in the one or more additional controls is longer than a cycle which includes a third period and a fourth period and in which the modes are switched in the second additional control included in the one or more additional controls.

According to this, the first additional control is less likely to give a stimulus that causes a person to have an odd feeling and discomfort, but nevertheless, the air volume of air can be more finely changed in the second additional control than in the first additional control, and a stimulus is more likely to be given to a person in the second additional control than in the first additional control. Accordingly, concentration of the driver can be expected to be maintained.

Variation 3 of Embodiment 1

First, a seat air-conditioning device according to this variation is to be explained with reference to FIG. 15.

Figure 15:
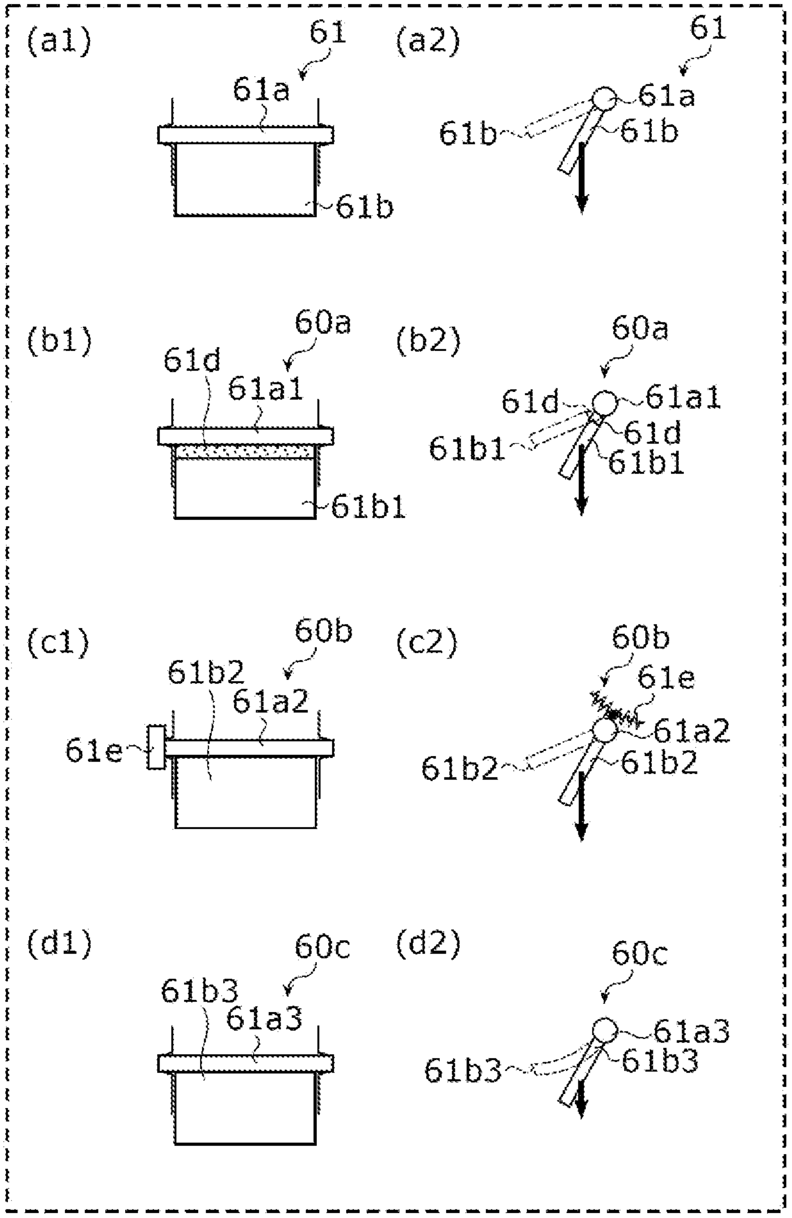
FIG. 15 shows front views and side views of an air-volume control mechanism.

FIG. 15 shows front views and side views of the air-volume control mechanism. The air-volume control mechanism illustrated in (a1) and (a2) of FIG. 15 have the same configuration as that of the air-volume control mechanism in Embodiment 1 explained above, for instance. Parts (a1) and (a2) of FIG. 15 illustrate first damper 61 as an example. FIG. 15 shows gravity with arrows.

In this variation, a difference from the seat air-conditioning device according to Variation 1 of Embodiment 1 is that the configuration of the air-volume control mechanism is different from that of the air-volume control mechanism according to Variation 1 of Embodiment 1. Other structural elements in this variation are similar to those in Variation 1 of Embodiment 1 unless otherwise stated in particular, and the same elements and functions are given with the same signs, so detailed explanations regarding the elements and functions are omitted.

In this variation, in the air-volume control mechanism, shaft 61*a*1 of damper 60*a* may not rotate as shown by Example 1 illustrated in (b1) and (b2) of FIG. 15. In the air-volume control mechanism, orientation maintainer 61*e* may be provided on shaft 61*a*2 of damper 60*b*, as shown by Example 2 illustrated in (c1) and (c2) of FIG. 15. In the air-volume control mechanism, flap 61*b*3 of damper 60*c* may elastically deform, as shown by Example 3 illustrated in (d1) and (d2) of FIG. 15.

Note that in this variation, the first damper and the second damper have the same configuration, and thus may be collectively and simply referred to as dampers. The shaft of the first damper and the shaft of the second damper have the same configuration, and thus may be collectively and simply referred to as shafts. Furthermore, the first flap and the second flap have the same configuration, and thus may be collectively and simply referred to as flaps.

Example 1

The air-volume control mechanism of the seat air-conditioning device is to be explained with reference to (b1) and (b2) of FIG. 15.

As shown in (b1) and (b2) of FIG. 15, damper 60*a* of the air-volume control mechanism of this variation includes connection portion 61*d* that connects shaft 61*a*1 and flap 61*b*1, in addition to shaft 61*a*1 and flap 61*b*1.

Shaft 61*a*1 is fixed on an air duct or a seat backrest. Accordingly, shaft 61*a*1 cannot rotate with respect to the air duct or the seat backrest.

Connection portion 61*d* is made of a flexible resin material. The flexible resin material is an elastomer resin, for example.

In this case, flap 61*b*1 is put in an orientation that is balanced according to the weight of itself and the flow rate of air that flows into the ventilation space. Accordingly, in the seat air-conditioning device, the orientation of flap 61*b*1 is automatically adjusted by connection portion 61*d* elastically deforming according to the flow rate of air that flows into the ventilation space.

Note that the first damper and the second damper have the same configuration as that of damper 60*a*, but only one of the first damper or the second damper may have the configuration of damper 60*a* according to this example.

Example 2

The air-volume control mechanism of the seat air-conditioning device is to be explained with reference to (c1) and (c2) of FIG. 15.

As shown in (c1) and (c2) of FIG. 15, damper 60*b* of the air-volume control mechanism in this variation includes orientation maintainer 61*e* coupled to shaft 61*a*2, in addition to shaft 61*a*2 and flap 61*b*2.

Shaft 61*a*2 is rotatably and axially supported by an air duct or a seat backrest.

Orientation maintainer 61*e* is an elastic member, and includes a spiral spring material or a coil spring, for example. Orientation maintainer 61*e* is coupled to shaft 61*a*2 and the air duct or the seat backrest. Orientation maintainer 61*e* can maintain, in an initial position, the orientation of flap 61*b*2 relative to the air duct or the seat backrest.

In this case, flap 61*b*2 is put in an orientation that is balanced according to the weight of itself and the flow rate of air that flows into the ventilation space. Accordingly, in damper 60*b*, the orientation of flap 61*b*2 is automatically adjusted by orientation maintainer 61*e*, according to the air volume of air that flows into the ventilation space.

Note that the first damper and the second damper have the same configuration as that of damper 60*b*, but only one of the first damper or the second damper may have the configuration of damper 60*b* in this example.

Example 3

The air-volume control mechanism of the seat air-conditioning device is to be explained with reference to (d1) and (d2) of FIG. 15.

As illustrated in (d1) and (d2) of FIG. 15, damper 60*c* of the air-volume control mechanism in this variation includes shaft 61*a*3 and flap 61*b*3.

Shaft 61*a*3 is fixed on an air duct or a seat backrest. Accordingly, shaft 61*a*3 cannot rotate with respect to the air duct or the seat backrest.

Flap 61*b*3 is made of a flexible resin material. The flexible resin material is an elastomer resin, for example. Note that shaft 61*a*3 may be made of a flexible resin material similarly to flap 61*b*3.

In this case, flap 61*b*3 is put in an orientation that is balanced according to the weight of itself and the flow rate of air that flows into the ventilation space. Accordingly, in damper 60*c*, the orientation of flap 61*b*3 is automatically adjusted by flap 61*b*3 elastically deforming according to the flow rate of air that flows into the ventilation space.

Note that the first damper and the second damper have the same configuration as that of damper 60*c*, but only one of the first damper or the second damper may have the configuration of damper 60*c* in this example.

As shown by these, how readily the first damper and the second damper rotate may be adjusted by changing the material of the flaps or by changing the configuration of the dampers. In this manner, the second damper can be configured to more readily rotate than the first damper. Furthermore, the first damper can be configured to more readily rotate than the second damper.

Embodiment 2

First, seat air-conditioning device 1*c* according to the present embodiment is to be explained with reference to FIG. 16 and FIG. 17.

Figure 16:
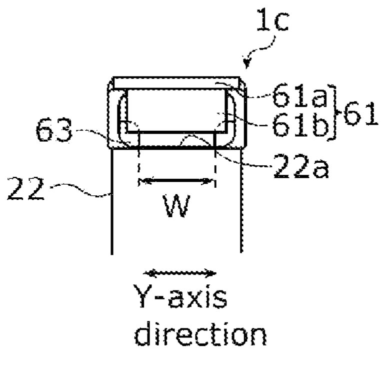
FIG. 16 is a front view of an enlarged portion of a seat air-conditioning device according to Embodiment 2.

FIG. 16 is a front view of an enlarged portion of seat air-conditioning device 1*c* according to Embodiment 2. FIG. 17 illustrates a relation between the orientation of a seat and the orientation of first flap 61*b*. Parts (a) and (b) of FIG. 17 show the case where an angle of seat backrest 13 is 90 degrees, whereas parts (c) and (d) of FIG. 17 show the case where an angle of seat backrest 13 is 60 degrees.

In the present embodiment, a difference from the seat air-conditioning device according to Embodiment 1 is that rotation adjuster 63 is included. Other structural elements in the present embodiment are similar to those in Embodiment 1 unless otherwise stated in particular, and the same elements and functions are given with the same signs, so detailed explanations regarding the elements and functions are omitted.

Figure 17:
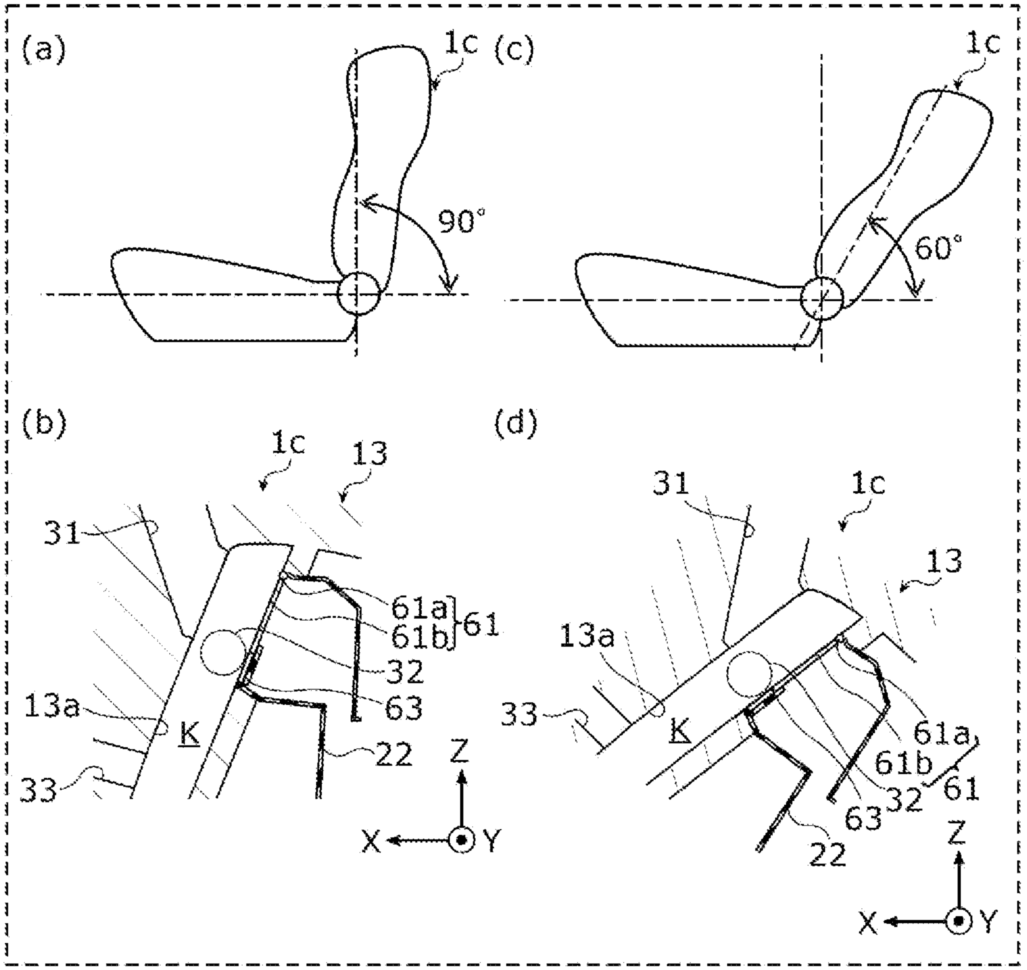
FIG. 17 illustrates a relation between the orientation of a seat and the orientation of the first flap.

In the present embodiment, as illustrated in FIG. 16 and FIG. 17, seat air-conditioning device 1*c* further includes rotation adjuster 63 provided in a flow path between (i) blower 20 and (ii) first ventilation path 31 and second ventilation path 32.

Rotation adjuster 63 adjusts rotation of first flap 61*b*. Specifically, rotation adjuster 63 restricts reverse rotation of first flap 61*b* from the closed position. Rotation adjuster 63 includes a stopper that restricts reverse rotation of first flap 61*b* from the closed position.

Rotation adjuster 63 is provided in a flow path between (i) blower 20 and (ii) first ventilation path 31 and second ventilation path 32, in such a manner that rotation adjuster 63 does not completely close the flow path. In the present embodiment, rotation adjuster 63 is provided in air-blow opening 22*a* of air duct 22.

In a portion of the flow path in which rotation adjuster 63 is provided, at least 50% of the portion in the width direction orthogonal to the longitudinal direction of the flow path is open. Specifically, as illustrated in FIG. 16, when air-blow opening 22*a* that is a portion of the flow path and rotation adjuster 63 are viewed in the X-axis direction, width W of rotation adjuster 63 in the Y-axis direction is at least ½ of the width of air-blow opening 22*a* in the Y-axis direction. Accordingly, even if first flap 61*b* and rotation adjuster 63 are provided in air-blow opening 22*a*, air can pass through from the gap between first flap 61*b* and air-blow opening 22*a*.

First flap 61*b* can rotate to control the flow rate of air that flows from blower 20 to first ventilation path 31 and second ventilation path 32. When first flap 61*b* rotates, first flap 61*b* hits and comes into contact with rotation adjuster 63, and thus can be displaced between a closed position in which a flow of air flowing from blower 20 to first ventilation path 31 and second ventilation path 32 is reduced and an open position in which air flows through from blower 20 to first ventilation path 31 and second ventilation path 32.

Specifically, rotation adjuster 63 comes into contact with first flap 61*b* and first flap 61*b* is brought into the closed position, when the angle of seat backrest 13 relative to the horizontal direction is from 60 degrees to 90 degrees.

<Operational Effects>

Next, operational effects of seat air-conditioning device 1*c* according to the present embodiment are to be explained.

As explained above, seat air-conditioning device 1*c* according to the present embodiment is seat air-conditioning device 1*c* for use in seat 2, and includes: blower 20 provided in seat 2; first ventilation path 31 that is provided in seat 2 and leads, to an upper body of a person seated in seat 2, air blown by blower 20 and to be blown out from first outlet 31*a*; second ventilation path 32 that is provided in seat 2 and leads, to the upper body of the person seated in seat 2, air blown by blower 20 and to be blown out from second outlet 32*a*; first damper 61 provided in seat 2 and in a flow path between (i) blower 20 and (ii) first ventilation path 31 and second ventilation path 32; and rotation adjuster 63 provided in the flow path. First damper 61 includes first flap 61*b* that can rotate to passively control a flow rate of air that flows from blower 20 to first ventilation path 31 and second ventilation path 32. Rotation adjuster 63 adjusts rotation of first flap 61*b*. First flap 61*b* hits rotation adjuster 63, and thus can be displaced between the closed position in which a flow of air flowing from blower 20 to first ventilation path 31 and second ventilation path 32 is reduced and the open position in which air flows from blower 20 to first ventilation path 31 and second ventilation path 32.

According to this, while seat 2 includes blower 20, first ventilation path 31, and second ventilation path 32, first damper 61 can passively control the flow rate of air flowing from blower 20 to first ventilation path 31 and second ventilation path 32, so that air can be blown onto the person seated in seat 2. Accordingly, in the present embodiment, a seat may not include an on-off valve or an actuator, for instance, for actively operating the on-off valve, as conventional technology requires.

The air velocity of air blown out from first outlet 31*a* and the air velocity of air blown out from second outlet 32*a* can be made different by controlling output of blower 20.

Thus, with seat air-conditioning device 1*c*, an increase in manufacturing cost and an increase in entire weight can be reduced, and comfortability of a person seated in seat 2 can be further improved.

In particular, rotation adjuster 63 restricts rotation of first flap 61*b* by first flap 61*b* hitting rotation adjuster 63. Accordingly, even if the orientation of seat 2 changes, reverse rotation of first flap 61*b* can be prevented.

In seat air-conditioning device 1*c* according to the present embodiment, seat 2 includes seat backrest 13 that is rotatable and supports the upper body of a person seated in seat 2. Rotation adjuster 63 hits first flap 61*b* when an angle of seat backrest 13 is from 60 degrees to 90 degrees.

According to this, even if the orientation of seat backrest 13 is tilted, reverse rotation of first flap 61*b* can be prevented by first flap 61*b* hitting rotation adjuster 63.

In seat air-conditioning device 1*c* according to the present embodiment, rotation adjuster 63 includes a stopper that restricts reverse rotation of first flap 61*b* from the closed position.

According to this, even if the orientation of seat backrest 13 is tilted, reverse rotation of first flap 61*b* can be further prevented by first flap 61*b* coming into contact with rotation adjuster 63.

In seat air-conditioning device 1*c* according to the present embodiment, rotation adjuster 63 is provided in a flow path in such a manner that the flow path is not completely closed.

According to this, the air volume of air for causing first flap 61*b* to passively rotate can be adjusted.

Thus, with seat air-conditioning device 1*c*, an increase in manufacturing cost and an increase in entire weight can be reduced, and comfortability of a person seated in seat 2 can be further improved.

In seat air-conditioning device 1*c* according to the present embodiment, in a portion of a flow path in which rotation adjuster 63 is provided, at least 50% of the portion in the width direction orthogonal to the longitudinal direction of the flow path is open.

According to this, even if first flap 61*b* is in the closed position, air from blower 20 can be caused to flow into ventilation space K, by preventing first flap 61*b* from closing air-blow opening 22*a*. Accordingly, operation failure of a vehicle door caused by self-induced vibrations caused by first flap 61*b* closing air-blow opening 22*a* can be prevented.

Variation 1 of Embodiment 2

First, seat air-conditioning device 1*d* according to this variation is to be explained with reference to FIG. 18 to FIG. 21.

Figure 18:
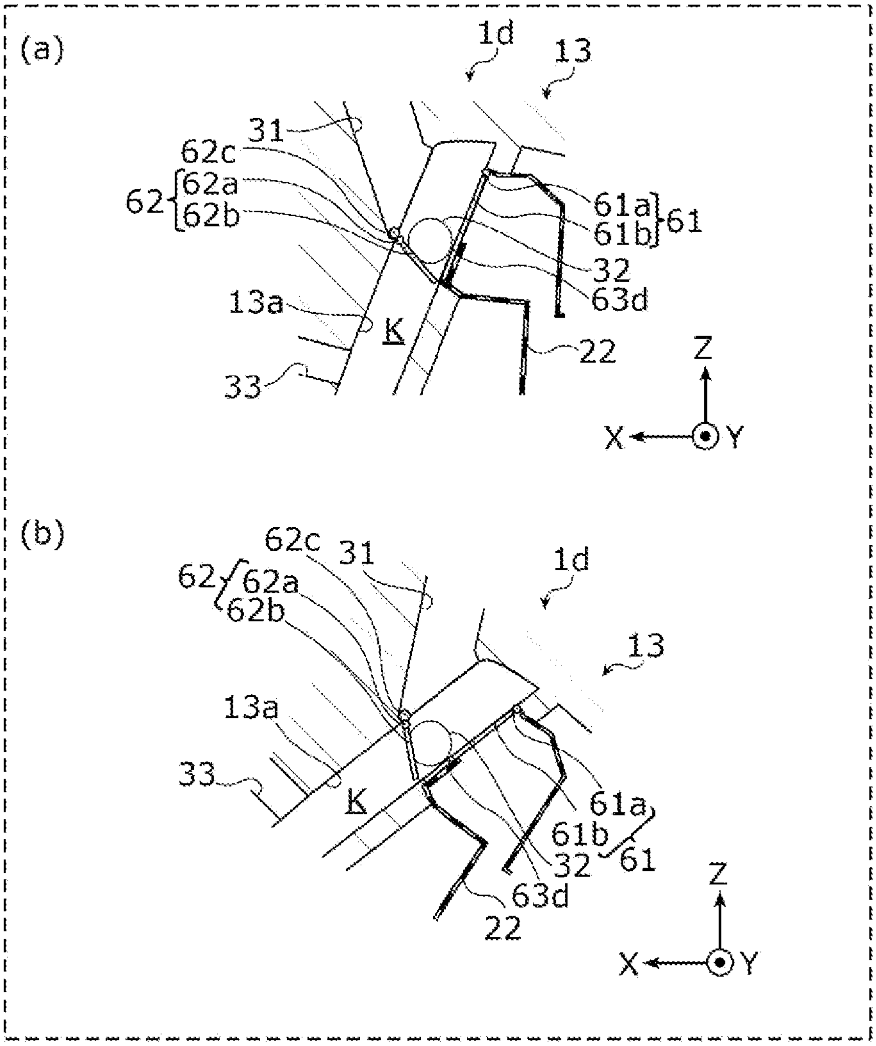
FIG. 18 shows elevation views of an enlarged portion of a seat air-conditioning device according to Variation 1 of Embodiment 2.
Figure 19:
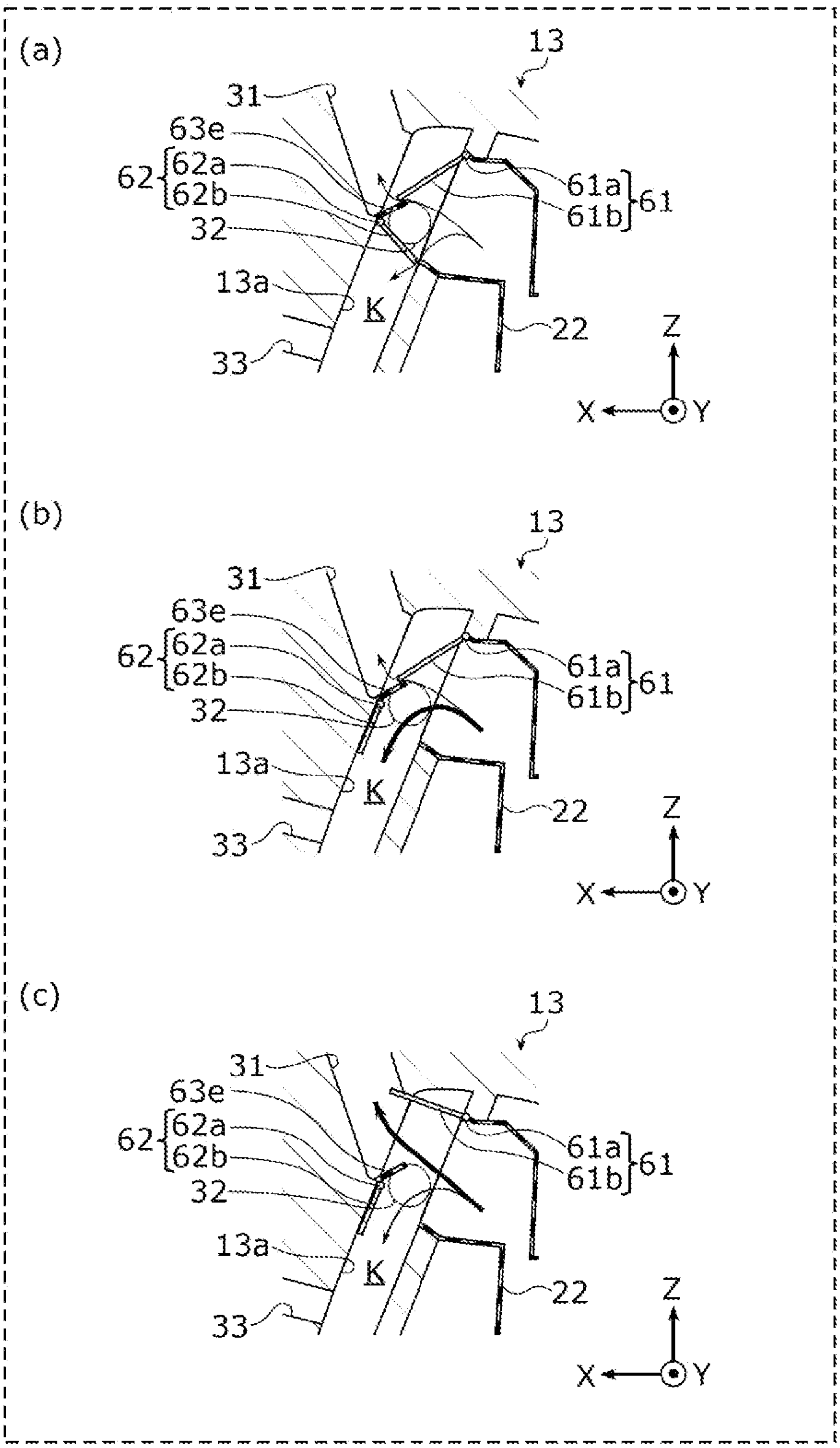
FIG. 19 shows cross-sectional views of an enlarged portion showing movement of the first flap and the second flap according to the flow rate of air flowing through the air duct and flows of air, in Variation 1 of Embodiment 2.
Figure 20:
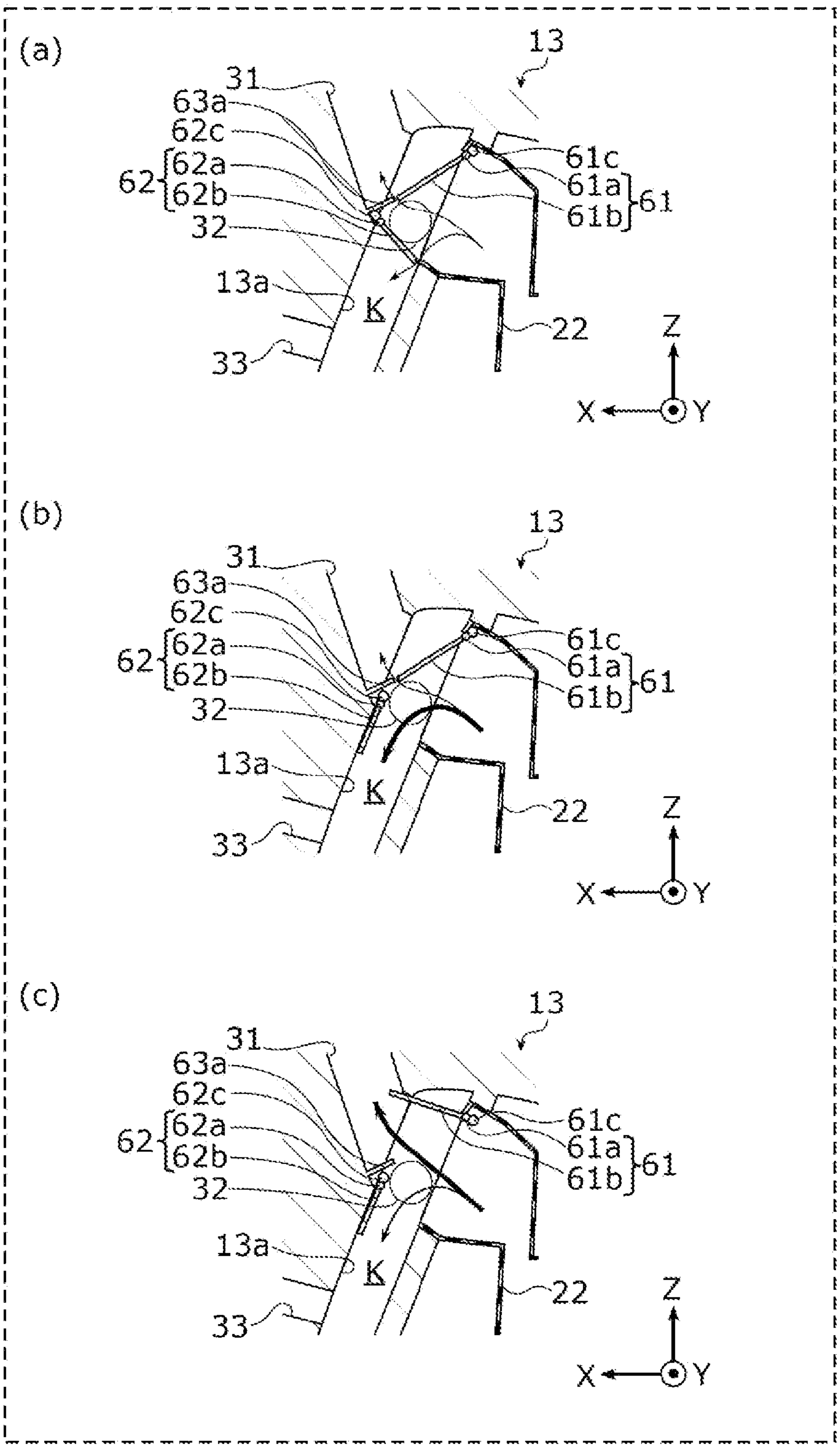
FIG. 20 shows other cross-sectional views of the enlarged portion showing movement of the first flap and the second flap according to the flow rate of air flowing through the air duct and flows of air, in Variation 1 of Embodiment 2.
Figure 21:
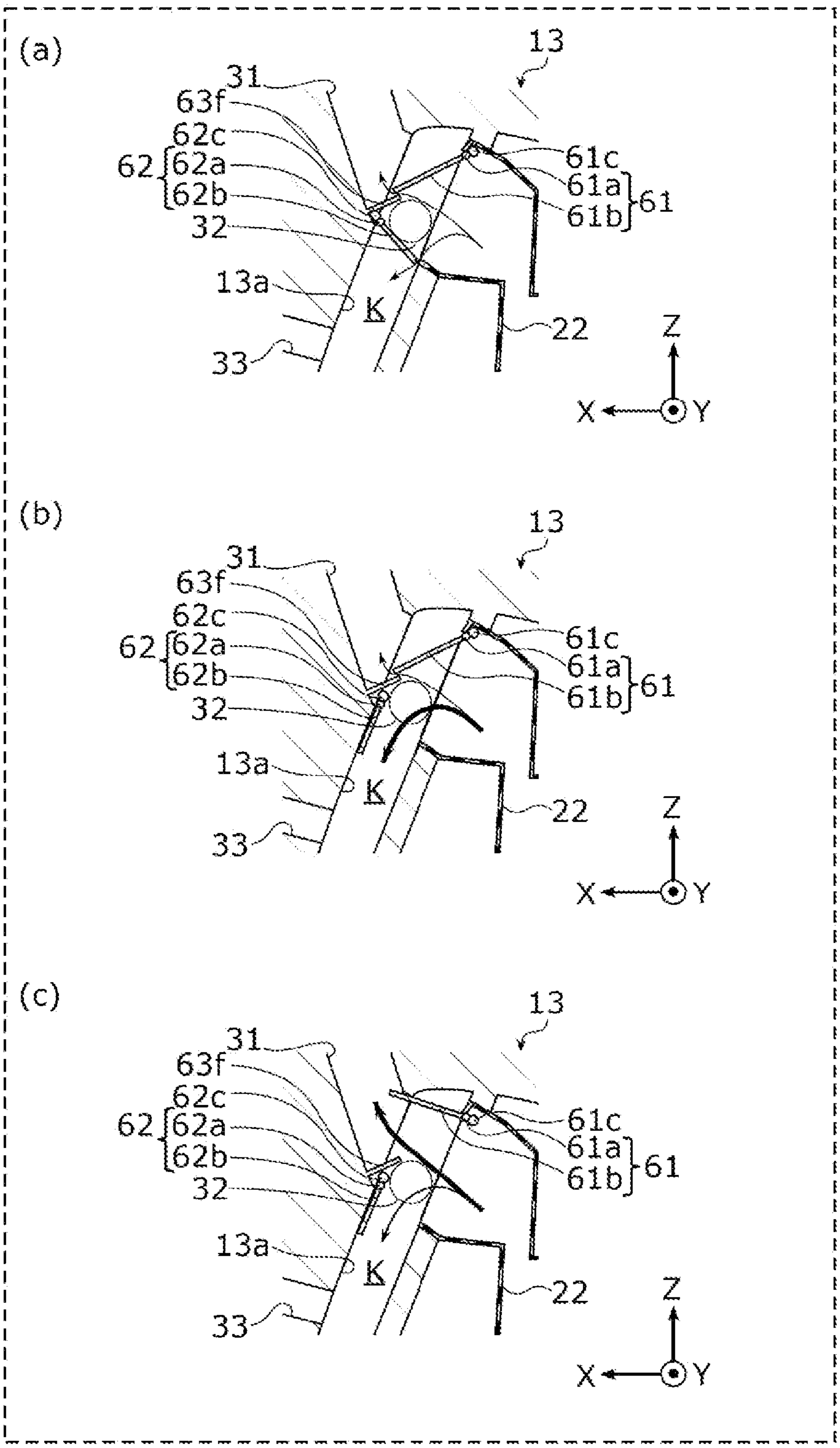
FIG. 21 shows yet other cross-sectional views of the enlarged portion showing movement of the first flap and the second flap according to the flow rate of air flowing through the air duct and flows of air, in Variation 1 of Embodiment 2.

FIG. 18 shows elevation views of an enlarged portion of seat air-conditioning device 1*d* according to Variation 1 of Embodiment 2. Part (a) of FIG. 18 shows the case where an angle of seat backrest 13 is 90 degrees, and part (b) of FIG. 18 shows the case where an angle of seat backrest 13 is 60 degrees. FIG. 19 shows cross-sectional views of an enlarged portion showing movement of first flap 61*b* and second flap 62*b* according to the flow rate of air flowing through air duct 22 and flows of air, in Variation 1 of Embodiment 2. FIG. 20 shows other cross-sectional views of the enlarged portion showing movement of first flap 61*b* and second flap 62*b* according to the flow rate of air flowing through air duct 22 and flows of air, in Variation 1 of Embodiment 2. FIG. 21 shows yet other cross-sectional views of the enlarged portion showing movement of first flap 61*b* and second flap 62*b* according to the flow rate of air flowing through air duct 22 and flows of air, in Variation 1 of Embodiment 2.

In this variation, a difference from the seat air-conditioning device according to Embodiment 2 is that the air-volume control mechanism includes first damper 61 and second damper 62. Other structural elements in this variation are similar to those in Embodiment 2 unless otherwise stated in particular, and the same elements and functions are given with the same signs, so detailed explanations regarding the elements and functions are omitted.

In this variation, as illustrated in (a) and (b) of FIG. 18, the air-volume control mechanism further includes second damper 62 provided in ventilation space K that is a branch space connected to first ventilation path 31 and third ventilation paths 33.

Second damper 62 includes second flap 62*b* that can be caused to rotate by air flowing through the flow path and shaft 62*a* that axially and rotatably supports second flap 62*b*. A rotation adjuster includes rotation mechanism 62*c* for causing second flap 62*b* to rotate, and stopper 63*d*. Note that rotation mechanism 62*c* may correspond to the "first rotation mechanism".

Shaft 62*a* extends in the Y-axis direction and can cause second flap 62*b* to freely rotate. Accordingly, second flap 62*b* can be readily caused to rotate by air flowing through air duct 22. In this variation, shaft 62*a* is on the X-axis positive side of second flap 62*b* in a state in which blower 20 is not operating.

Second flap 62*b* is provided in ventilation space K to prevent air from flowing from ventilation space K to third ventilation paths 33, or stated differently, to lead air to first ventilation path 31 and second ventilation path 32. In the closed position, second flap 62*b* is rotatable to control the flow rate of air that has flown into ventilation space K through air duct 22 and flows into third ventilation paths 33. For example, when the flow rate of air flowing into ventilation space K increases, second flap 62*b* rotates to be brought into the open position to cause air to be blown out from third outlets 33*a* of third ventilation paths 33. Further, when the flow rate of air flowing into ventilation space K is low, second flap 62*b* slightly rotates to cause a very small amount of air to be blown out from third outlets 33*a* of third ventilation paths 33.

When the flow rate of air flowing into ventilation space K is very low, the air applies almost no force that causes second flap 62*b* to rotate, and thus second flap 62*b* is in the closed position. The air is mainly blown out from first outlet 31*a* of first ventilation path 31 and second outlets 32*a* of second ventilation path 32. A very small amount of air flowing into from the gap between second flap 62*b* and seat backrest 13 is blown out from third outlets 33*a* of third ventilation paths 33.

Rotation mechanism 62*c* is provided across shaft 62*a* from second flap 62*b*. Specifically, rotation mechanism 62*c* is a counterweight provided across from second flap 62*b* that rotates about an axis. In this manner, since rotation mechanism 62*c* is provided, as illustrated in (a) of FIG. 18, rotation mechanism 62*c* can cancel out rotation moment applied to second flap 62*b* due to gravity. When an angle of seat backrest 13 relative to the horizontal direction is in a range from 60 degrees to 90 degrees, rotation mechanism 62*c* decreases rotation moment about shaft 62*a* applied to second flap 62*b* due to gravity, to allow second flap 62*b* to rotate when there is an air flow. Accordingly, rotation mechanism 62*c* included in the rotation adjuster can adjust rotation of second flap 62*b*.

Seat air-conditioning device 1*d* includes stopper 63*d* provided in a flow path from first ventilation path 31 to ventilation space K.

Stopper 63*d* restricts reverse rotation of first flap 61*b* from the closed position. In this variation, stopper 63*d* is provided in a boundary portion between air duct 22 and ventilation space K or in a boundary portion between first ventilation path 31 and ventilation space K. Parts (a) and (b) of FIG. 18 show, as an example, the case where stopper 63*d* is provided in the boundary portion between air duct 22 and ventilation space K. Stopper 63*d* is provided in such a manner that air duct 22 and a flow path to ventilation space K are not completely closed. Stopper 63*d* may have the same configuration as that of the rotation adjustment mechanism in Embodiment 2.

When second flap 62*b* provided with rotation mechanism 62*c* rotates, second flap 62*b* can be displaced between the closed position in which a flow of air flowing from blower 20 to third ventilation paths 33 is reduced and the open position in which air is caused to flow from blower 20 to third ventilation paths 33, according to a balance between gravity and air from air-blow opening 22*a*.

Note that as illustrated in (a) to (c) of FIG. 19, stopper 63*e* may be provided in vicinity of shaft 62*a* of second damper 62.

For example, as illustrated in (a) of FIG. 19, controller 40 may make the flow rate of air flowing through air duct 22 very low by controlling output of blower 20. In this case, the air does not cause first flap 61*b* or second flap 62*b* to rotate. Accordingly, air is blown out mainly from second outlets 32*a* of second ventilation path 32. A very small amount of air that has flown into from the gap between first flap 61*b* and stopper 63*e* is blown out from first outlet 31*a* of first ventilation path 31, and a very small amount of air that has flown into from the gap between second flap 62*b* and seat backrest 13 is blown out from third outlets 33*a* of third ventilation paths 33. Note that stopper 63*e* is included in the rotation adjuster.

As illustrated in (b) of FIG. 19, controller 40 may decrease the flow rate of air flowing through air duct 22 by controlling output of blower 20. In this case, the air does not cause first flap 61*b* to rotate and causes second flap 62*b* to rotate. Accordingly, a very small amount of air that has flown into from the gap between first flap 61*b* and stopper 63*e* is blown out from first outlet 31*a* of first ventilation path 31, and at the same time, air is also blown out from second outlets 32*a* of second ventilation path 32. Since second flap 62*b* rotates, air that has flown in is blown out from third outlets 33*a* of third ventilation paths 33.

For example, as illustrated in (c) of FIG. 19, controller 40 may increase the flow rate of air flowing through air duct 22 by controlling output of blower 20. In this case, the air causes first flap 61*b* and second flap 62*b* to rotate. Accordingly, much air is blown out from first outlet 31*a* of first ventilation path 31, and also air less than the air blown out from first outlet 31*a* is blown out from second outlets 32*a* of second ventilation path 32. Since second flap 62*b* rotates, air that has flown in is blown out also from third outlets 33*a* of third ventilation paths 33.

Note that as illustrated in (a) to (c) of FIG. 20, instead of the stopper, protrusion 63*a* that does not come into contact with first flap 61*b* may be provided in vicinity of shaft 62*a* of second damper 62. Protrusion 63*a* protrudes to reduce the gap defined by first flap 61*b*. Thus, a stopper may not be provided. In this case, first damper 61 may include rotation mechanism 61*c*. Rotation mechanism 61*c* of first damper 61 may be provided across shaft 61*a* from first flap 61*b*. Specifically, rotation mechanism 61*c* is a counterweight provided across from first flap 61*b* that rotates about an axis. In this manner, since rotation mechanism 61*c* is provided, rotation mechanism 62*c* can cancel out rotation moment applied to first flap 61*b* due to gravity, as illustrated in (a) of FIG. 20. Second damper 62 may include rotation mechanism 62*c*. Note that rotation mechanism 61*c* may correspond to the "second rotation mechanism".

For example, as illustrated in (a) of FIG. 20, controller 40 may make the flow rate of air flowing through air duct 22 very low by controlling output of blower 20. In this case, the air does not cause first flap 61*b* and second flap 62*b* to rotate. Accordingly, air is blown out from second outlets 32*a* of second ventilation path 32. A very small amount of air that has flown into from the gap between first flap 61*b* and protrusion 63*a* is blown out from first outlet 31*a* of first ventilation path 31, and a very small amount of air that has flown into from the gap between second flap 62*b* and seat backrest 13 is blown out from third outlets 33*a* of third ventilation paths 33.

As illustrated in (b) of FIG. 20, controller 40 may decrease the flow rate of air flowing through air duct 22 by controlling output of blower 20. In this case, the air does not cause first flap 61*b* to rotate and causes second flap 62*b* to rotate. Accordingly, a very small amount of air that has flown into from the gap between first flap 61*b* and protrusion 63*a* is blown out from first outlet 31*a* of first ventilation path 31, and at the same time, air is also blown out from second outlets 32*a* of second ventilation path 32. Since second flap 62*b* rotates, air that has flown in is blown out from third outlets 33*a* of third ventilation paths 33.

For example, as illustrated in (c) of FIG. 20, controller 40 may increase the flow rate of air flowing through air duct 22 by controlling output of blower 20. In this case, the air causes first flap 61*b* and second flap 62*b* to rotate. Accordingly, much air is blown out from first outlet 31*a* of first ventilation path 31, and also air less than the air blown out from first outlet 31*a* is blown out from second outlets 32*a* of second ventilation path 32. Since second flap 62*b* rotates, air that has flown in is blown out also from third outlets 33*a* of third ventilation paths 33.

Note that as illustrated in (a) to (c) of FIG. 21, stopper 63*f* may be provided in vicinity of shaft 62*a* of second damper 62. In this case, first damper 61 may include rotation mechanism 61*c*, and second damper 62 may include rotation mechanism 62*c*. The movement of first flap 61*b* and second flap 62*b* and the flows of air illustrated in (a) to (c) of FIG. 21 are the same as the movement of first flap 61*b* and second flap 62*b* and the flows of air illustrated in (a) to (c) of FIG. 19 as stated above.

Such seat air-conditioning device 1*d* according to this variation is provided in seat 2, and includes third ventilation paths 33 that lead, to the upper body of a person seated in seat 2, air blown by blower 20 and to be blown out from third outlets 33*a*, and second damper 62 provided in a branch space connected to first ventilation path 31 and third ventilation paths 33. Second damper 62 includes second flap 62*b* that can be caused to rotate by air flowing through a flow path. The rotation adjuster includes a first rotation mechanism (rotation mechanism 62*c*) for causing second flap 62*b* to rotate.

According to this, even if the orientation of seat 2 is changed, rotation mechanism 62*c* can cause second flap 62*b* to rotate to cancel out rotation moment applied to second flap 62*b* due to gravity. Accordingly, even if the orientation of seat 2 is changed, second flap 62*b* can be caused to rotate at a constant air velocity, or alternatively, a change in air velocity necessary to cause second flap 62*b* to rotate can be decreased.

In seat air-conditioning device 1*d* according to this variation, seat 2 includes seat backrest 13 that is rotatable and supports the upper body of a person seated in seat 2. Second damper 62 includes shaft 62*a* that rotatably and axially supports second flap 62*b*. When an angle of seat backrest 13 relative to the horizontal direction is in a range from 60 degrees to 90 degrees, the first rotation mechanism (rotation mechanism 62*c*) decreases rotation moment about shaft 62*a* applied to second flap 62*b* due to gravity.

According to this, even if the orientation of seat backrest 13 is tilted, second flap 62*b* can be caused to rotate at a constant air velocity, or alternatively, a change in air velocity necessary to cause second flap 62*b* to rotate can be decreased.

In seat air-conditioning device 1*d* according to this variation, the first rotation mechanism (rotation mechanism 62*c*) is a counterweight provided across from second flap 62*b* that rotates about an axis.

According to this, second flap 62*b* can be caused to appropriately rotate at a constant air velocity, or alternatively, a change in air velocity necessary to cause second flap 62*b* to rotate can be decreased.

In seat air-conditioning device 1*d* according to this variation, the rotation adjuster includes a second rotation mechanism (rotation mechanism 61*c*) that causes first flap 61*b* to rotate.

According to this, even if the orientation of seat 2 is changed, rotation mechanism 61*c* can cause first flap 61*b* to rotate to cancel out rotation moment applied to first flap 61*b* due to gravity. Accordingly, even if the orientation of seat 2 is changed, first flap 61*b* can be caused to rotate at a constant air velocity, or alternatively, a change in air velocity necessary to cause first flap 61*b* to rotate can be decreased.

Variation 2 of Embodiment 2

First, a seat air-conditioning device according to this variation is to be explained with reference to FIG. 22 and FIG. 23.

Figure 22:
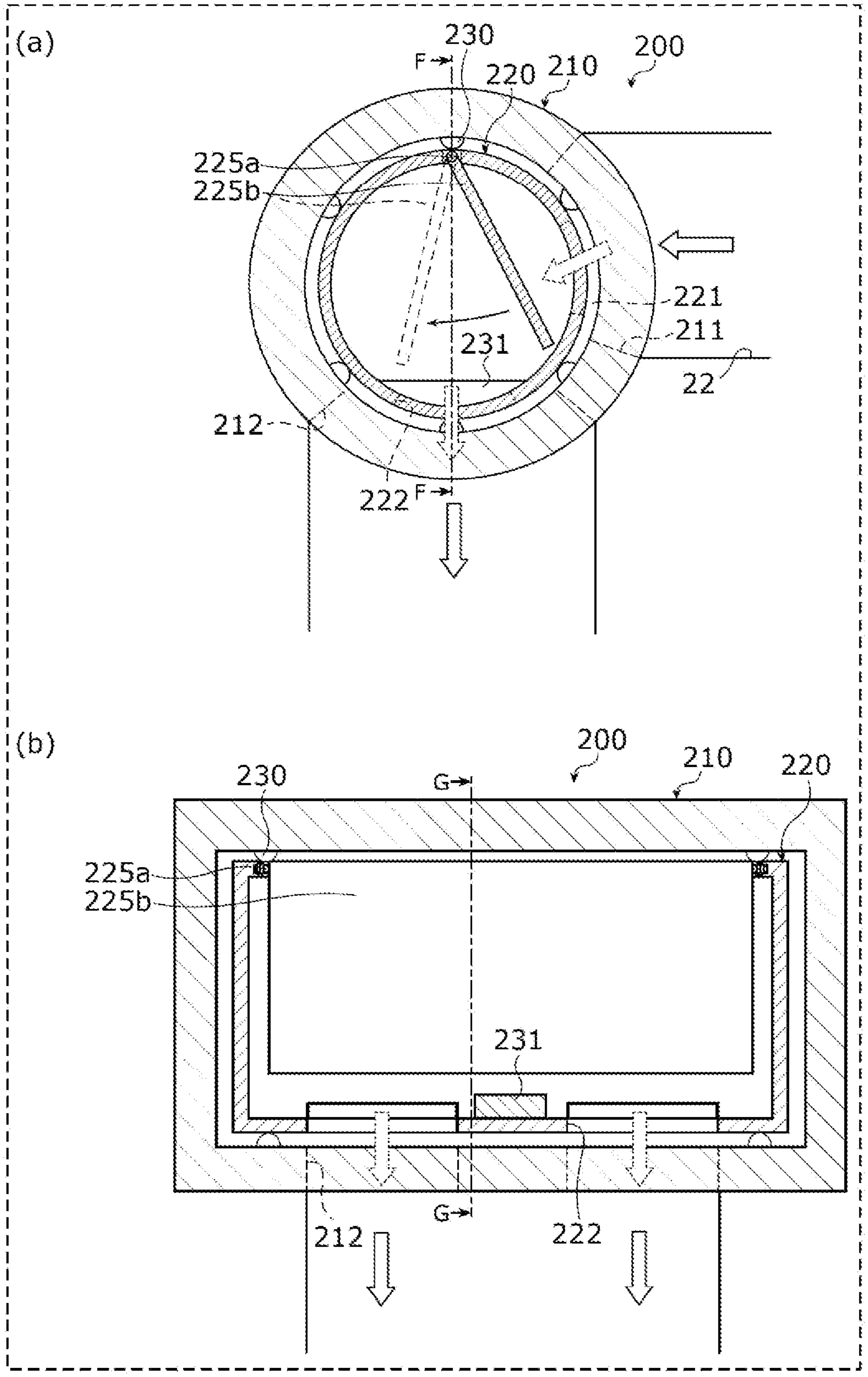
FIG. 22 shows cross sectional views of a first damper in Variation 2 of Embodiment 2.
Figure 23:
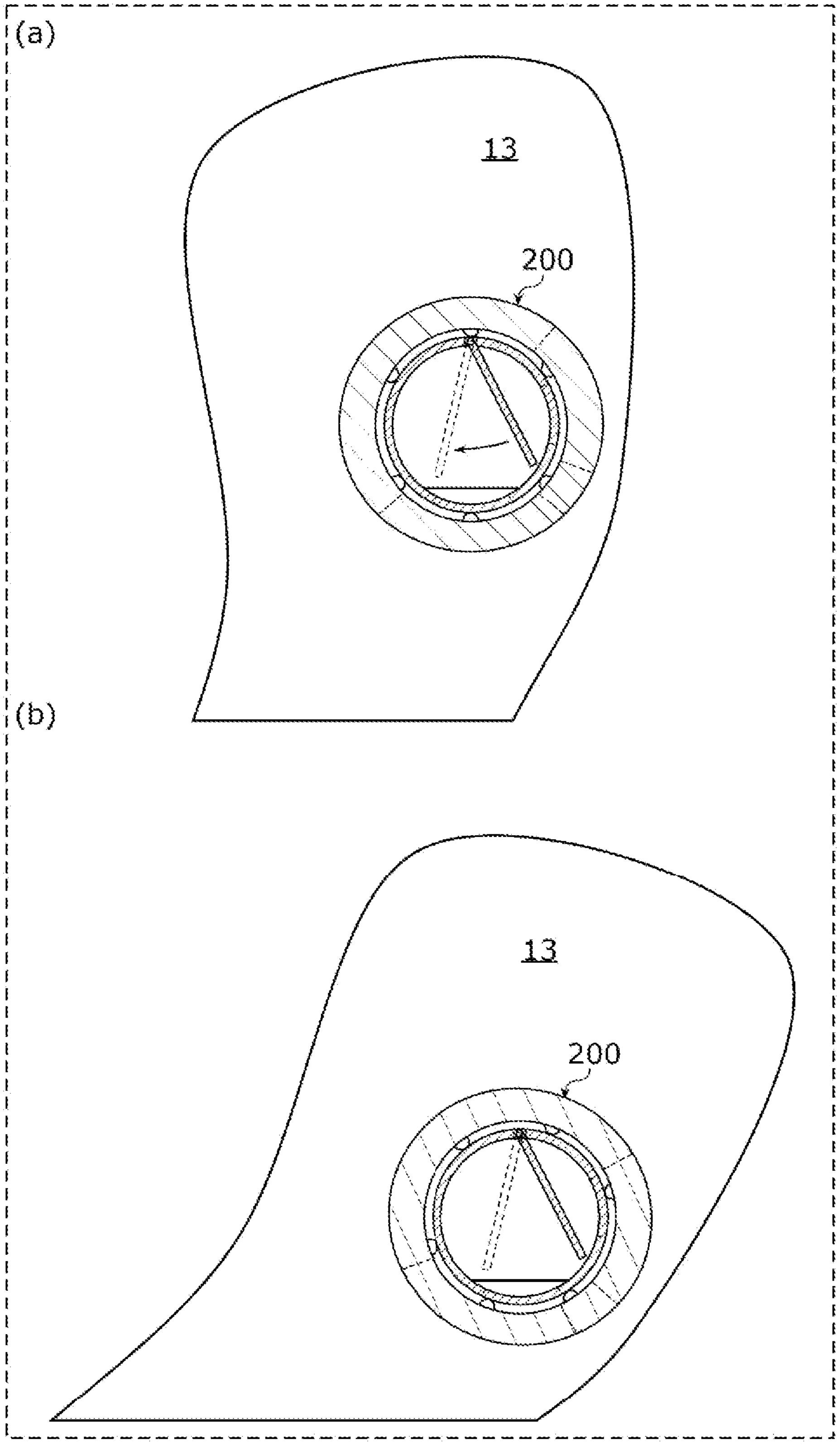
FIG. 23 shows states of the first damper according to an orientation of the seat.

FIG. 22 shows cross sectional views of first damper 200 in Variation 2 of Embodiment 2. FIG. 23 shows states of first damper 200 according to an orientation of seat 2. Part (a) of FIG. 22 is a cross sectional view of first damper 200 taken along line G-G in (b) of FIG. 22, and (b) of FIG. 22 is a cross sectional view of first damper 200 taken along line F-F in (a) of FIG. 22.

In this variation, a difference from the seat air-conditioning device according to Embodiment 2 is that the configuration of first damper 200 is different from the first damper in Embodiment 2. Other structural elements in this variation are similar to those in Embodiment 2 unless otherwise stated in particular, and the same elements and functions are given with the same signs, so detailed explanations regarding the elements and functions are omitted.

In this variation, as illustrated in FIG. 22, first damper 200 further includes first inner barrel 220, first outer barrel 210, rotation mechanism 230, and weight 231 provided in first inner barrel 220, in addition to first flap 225*b* and shaft 225*a*.

First inner barrel 220 is in a cylindrical shape, and rotatably supports first flap 225*b*. Shaft 225*a* of first flap 225*b* is coupled to the inner circumferential surface of first inner barrel 220. Specifically, shaft 225*a* is coupled to the inner circumferential surface of first inner barrel 220, being parallel to the central axis of first inner barrel 220. When the flow rate of air is zero, shaft 225*a* includes a spring to bring first flap 225*b* to a position indicated by the solid line in (a) of FIG. 22.

Note that Variation 2 of Embodiment 1 can be applied to the configuration of first flap 225*b*.

First outer barrel 210 is in a cylindrical shape, and accommodates first inner barrel 220. First outer barrel 210 accommodates also rotation mechanism 230. First outer barrel 210 is fixed to at least one of seat backrest 13 or air duct 22. More specifically, first damper 200 may be provided in first ventilation path 31, second ventilation path 32, any of third ventilation paths 33, or ventilation space K, for instance.

Rotation mechanism 230 is provided between first inner barrel 220 and first outer barrel 210. Rotation mechanism 230 rotatably supports first inner barrel 220 within first outer barrel 210. Rotation mechanism 230 is a bearing that rotatably supports first inner barrel 220 within first outer barrel 210. Accordingly, since the orientation of seat backrest 13 is tilted, even if the orientation of first damper 200 changes, the orientation of first inner barrel 220 does not greatly change since first inner barrel 220 rotates with respect to first outer barrel 210.

First outer barrel 210 includes outer-barrel intake port 211, and first inner barrel 220 includes inner-barrel intake port 221.

Specifically, first outer barrel 210 includes outer-barrel intake port 211 which is provided in the outer circumferential surface of first outer barrel 210 and through which air flows into from blower 20. First inner barrel 220 includes inner-barrel intake port 221 which is provided in the outer circumferential surface of first inner barrel 220 and through which air flows into from blower 20 via outer-barrel intake port 211. Thus, inner-barrel intake port 221 is opposed to outer-barrel intake port 211, and communicates with outer-barrel intake port 211. Accordingly, air from blower 20 flows into the inside of first inner barrel 220 via outer-barrel intake port 211 and inner-barrel intake port 221.

Such outer-barrel intake port 211 may communicate with ventilation space K or air duct 22.

First outer barrel 210 includes outer-barrel blowing port 212, and first inner barrel 220 includes inner-barrel blowing port 222.

Specifically, first outer barrel 210 includes outer-barrel blowing port 212 that is provided in the outer circumferential surface of first outer barrel 210, and leads, to first ventilation path 31 and second ventilation path 32, air that has flown into from outer-barrel intake port 211 and inner-barrel intake port 221. First inner barrel 220 includes inner-barrel blowing port 222 which is provided in the outer circumferential surface of first inner barrel 220, and through which air that has flown into through outer-barrel intake port 211 and inner-barrel intake port 221 is blown out via outer-barrel blowing port 212. Thus, inner-barrel blowing port 222 is opposed to outer-barrel blowing port 212, and communicates with outer-barrel blowing port 212. Such outer-barrel blowing port 212 may communicate with ventilation space K, first ventilation path 31, second ventilation path 32, or third ventilation paths 33. Accordingly, air that has flown into the inside of first inner barrel 220 is blown out via outer-barrel blowing port 212 and inner-barrel blowing port 222 to ventilation space K, first ventilation path 31, second ventilation path 32, and third ventilation paths 33.

Outer-barrel intake port 211 has an opening area greater than that of inner-barrel intake port 221. Outer-barrel blowing port 212 has an opening area greater than that of inner-barrel blowing port 222. Accordingly, as illustrated in (a) and (b) of FIG. 23, even if the orientation of first damper 200 changes by the orientation of seat backrest 13 tilting and first inner barrel 220 rotates with respect to first outer barrel 210, a state in which outer-barrel intake port 211 and inner-barrel intake port 221 communicate with each other and outer-barrel blowing port 212 and inner-barrel blowing port 222 communicate with each other is maintained.

Weight 231 is a counterweight. Weight 231 is provided across from shaft 225*a* of first damper 200. Thus, weight 231 and shaft 225*a* of first damper 200 are provided axisymmetrically with respect to the central axis of first inner barrel 220 in a cylindrical shape. Weight 231 may be provided inside first inner barrel 220 or may be embedded in first inner barrel 220. Weight 231 is provided at first inner barrel 220 in such a manner that weight 231 does not come into contact with first flap 225*b* inside first inner barrel 220 or does not close inner-barrel intake port 221 or inner-barrel blowing port 222.

In this manner, even if the orientation of seat backrest 13 is changed, rotation moment can be applied to first inner barrel 220 by the heaviness of weight 231. Accordingly, shaft 225*a* of first damper 200 is at an upper position, whereas weight 231 is at a lower position.

In this variation, as shown by Example 1 below, first damper 200 may include vibration absorbing mechanism 229. Furthermore, in this variation, as shown by Example 2 below, first damper 200 may include wall portion 241.

Note that in this variation, first damper 200 has been explained, yet the same applies to the second damper. Stated differently, a configuration same as the configuration of first damper 200 stated above may be applied to the configuration of the second damper. Accordingly, first damper 200 may be read as the second damper. In addition, the elements of first damper 200 may be applied as elements of the second damper. Moreover, the elements of first damper 200 may be read as elements of the second damper.

In such a seat air-conditioning device according to this variation, first damper 200 includes first inner barrel 220 that rotatably supports first flap 225*b*, and first outer barrel 210 that accommodates first inner barrel 220. Rotation adjuster 63 includes rotation mechanism 230 provided between first inner barrel 220 and first outer barrel 210.

Accordingly, even if the orientation of seat 2 is changed, rotation of first flap 225*b* can be prevented.

In the seat air-conditioning device according to this variation, the second damper includes a second inner barrel that rotatably supports a second flap, and a second outer barrel that accommodates the second inner barrel. Rotation adjuster 63 includes a rotation mechanism provided between the second inner barrel and the second outer barrel.

Also in this case, operational effects similar to those stated above can be achieved.

In the seat air-conditioning device according to this variation, rotation mechanism 230 rotatably supports first inner barrel 220 inside first outer barrel 210.

According to this, even if the orientation of seat 2 is changed, first inner barrel 220 rotates inside first outer barrel 210, and thus the orientation of first damper 200 can be maintained. Accordingly, even if the orientation of seat 2 is changed, rotation of first flap 225*b* can be prevented.

In the seat air-conditioning device according to this variation, the rotation mechanism rotatably supports the second inner barrel inside the second outer barrel.

Also in this case, operational effects similar to those stated above can be achieved.

In the seat air-conditioning device according to this variation, rotation mechanism 230 is a bearing that rotatably supports first inner barrel 220 inside first outer barrel 210.

According to this, even if the orientation of seat 2 is changed, the bearing allows first inner barrel 220 to rotate inside first outer barrel 210, and thus can maintain the orientation of first damper 200. Accordingly, even if the orientation of seat 2 is changed, rotation of first flap 225*b* can be further prevented.

In the seat air-conditioning device according to this variation, the rotation mechanism is a bearing that rotatably supports the second inner barrel inside the second outer barrel.

Also in this case, operational effects similar to those stated above can be achieved.

In the seat air-conditioning device according to this variation, first outer barrel 210 includes outer-barrel intake port 211 through which air from blower 20 flows into. First inner barrel 220 includes inner-barrel intake port 221 through which air from blower 20 flows into via outer-barrel intake port 211. First outer barrel 210 includes outer-barrel blowing port 212 that leads air that has flown into from inner-barrel intake port 221 to first ventilation path 31 and second ventilation path 32. First inner barrel 220 includes inner-barrel blowing port 222 through which air that has flown into from inner-barrel intake port 221 is blown out via outer-barrel blowing port 212. Outer-barrel intake port 211 has an opening area greater than that of inner-barrel intake port 221. Outer-barrel blowing port 212 has an opening area greater than that of inner-barrel blowing port 222.

According to this, first inner barrel 220 rotates inside first outer barrel 210 due to a change in the orientation of seat 2, and thus a state in which inner-barrel intake port 221 and outer-barrel intake port 211 communicate with each other and inner-barrel blowing port 222 and outer-barrel blowing port 212 communicate with each other can be maintained.

In the seat air-conditioning device according to this variation, the second outer barrel includes an outer-barrel intake port through which air from blower 20 flows into. The second inner barrel includes an inner-barrel intake port through which air from blower 20 flows into via the outer-barrel intake port. The second outer barrel includes an outer-barrel blowing port that leads air that has flown into from the inner-barrel intake port to third ventilation paths. The second inner barrel includes an inner-barrel blowing port through which air that has flown into through the inner-barrel intake port is blown out via the outer-barrel blowing port. The outer-barrel intake port has an opening area greater than that of the inner-barrel intake port. The outer-barrel blowing port has an opening area greater than that of the inner-barrel blowing port.

Also in this case, operational effects similar to those stated above can be achieved.

In the seat air-conditioning device according to this variation, first damper 200 includes weight 231 provided at first inner barrel 220.

According to this, even if the orientation of seat 2 is changed, first inner barrel 220 rotates inside first outer barrel 210 due to the gravity of weight 231, and thus shaft 225*a* of first damper 200 is at an upper position, and weight 231 is at a lower position.

In the seat air-conditioning device according to this variation, the second damper includes a weight provided at the second inner barrel.

Also in this case, operational effects similar to those stated above can be achieved.

Example 1

First damper 200*a* of a seat air-conditioning device is to be explained with reference to FIG. 24.

Figure 24:
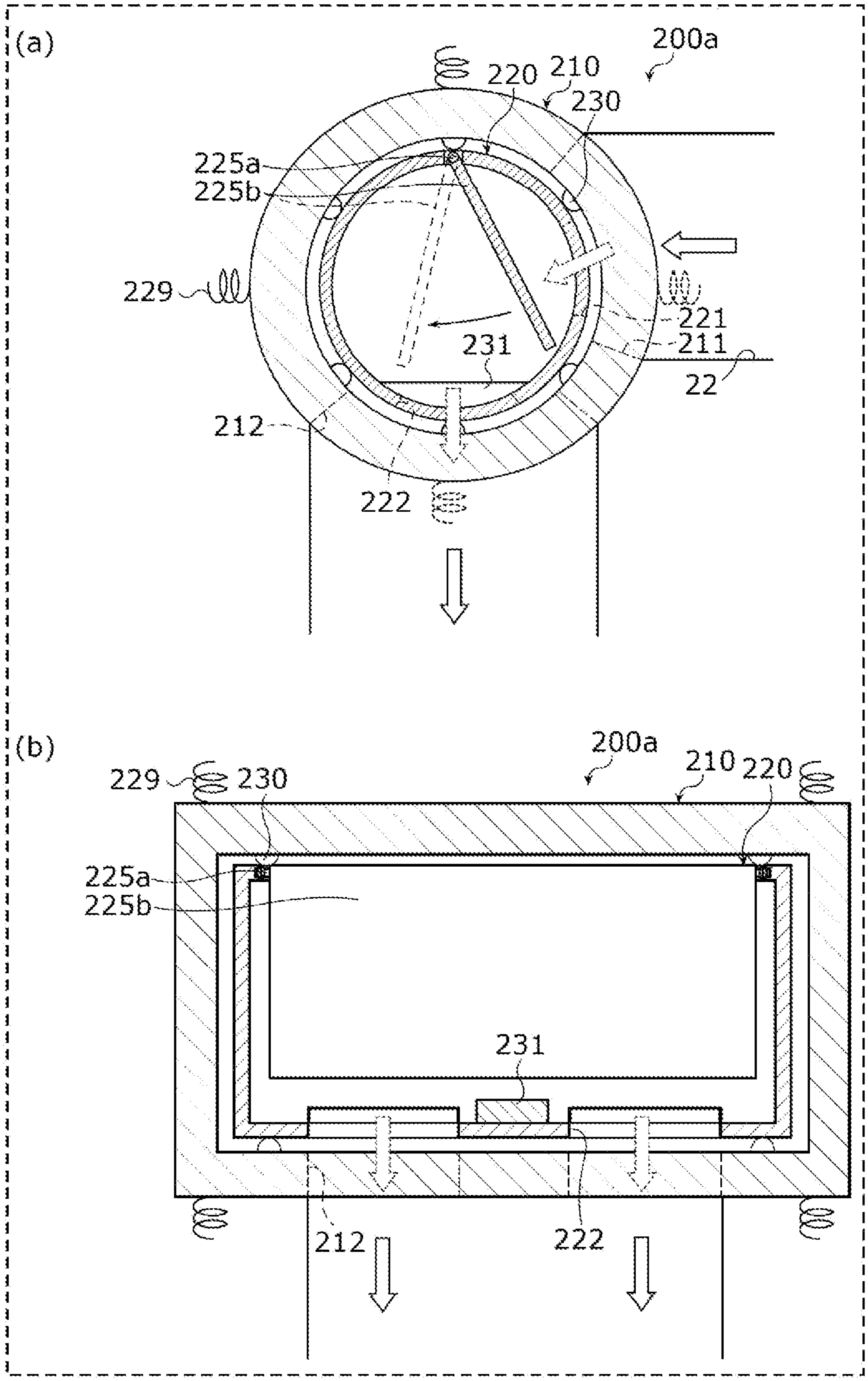
FIG. 24 shows cross sectional views of a first damper in Example 1 of Variation 2 of Embodiment 2.

FIG. 24 illustrates first damper 200*a* in Example 1 of Variation 2 of Embodiment 2.

First damper 200*a* according to this variation includes vibration absorbing mechanism 229 provided on first inner barrel 220, in addition to shaft 225*a*, first flap 225*b*, first inner barrel 220, first outer barrel 210, and rotation mechanism 230.

Vibration absorbing mechanism 229 is at least one of a set of springs or a shock absorber provided between seat 2 and first outer barrel 210. Vibration absorbing mechanism 229 is connected to first outer barrel 210, and absorbs vibrations transmitted to seat 2.

Vibration absorbing mechanism 229 couples at least one of seat backrest 13 or air duct 22 to first outer barrel 210. Accordingly, even if vibrations are transmitted to seat 2, vibration absorbing mechanism 229 can absorb the vibrations, and thus the vibrations transmitted to seat 2 are less likely to be transmitted to first damper 200*a*. Note that first outer barrel 210 is configured to absorb vibrations by being suspended by vibration absorbing mechanism 229, and thus air duct 22 and first outer barrel 210 are not directly fixed to each other and have a slight gap therebetween.

In such a seat air-conditioning device according to this variation, first damper 200*a* includes vibration absorbing mechanism 229 that is connected to first outer barrel 210 and absorbs vibrations transmitted to seat 2.

According to this, even if seat 2 vibrates, vibration absorbing mechanism 229 can absorb vibrations transmitted to first damper 200*a*, and thus first damper 200*a* is less likely to be shaken. Accordingly, rotation of first flap 225*b* caused by vibrations can be prevented.

In the seat air-conditioning device according to this variation, the second damper includes a vibration absorbing mechanism that is connected to the second outer barrel and absorbs vibrations transmitted to seat 2.

Also in this case, operational effects similar to those stated above can be achieved.

In the seat air-conditioning device according to this variation, vibration absorbing mechanism 229 is at least one of a set of springs or a shock absorber provided between seat 2 and first outer barrel 210.

According to this, even if seat 2 vibrates, vibration absorbing mechanism 229 can absorb vibrations transmitted to first damper 200*a*, and thus first damper 200*a* is less likely to be shaken. Accordingly, rotation of first flap 225*b* caused by vibrations can be prevented.

Furthermore, first damper 200*a* can be readily installed in seat 2, by using at least one of a set of springs or a shock absorber as vibration absorbing mechanism 229.

In the seat air-conditioning device according to this variation, the vibration absorbing mechanism is at least one of a set of springs or a shock absorber provided between seat 2 and the second outer barrel.

Also in this case, operational effects similar to those stated above can be achieved.

Example 2

First dampers 200*b* and 200*c* of a seat air-conditioning device are to be explained with reference to FIG. 25 and FIG. 26.

Figure 25:
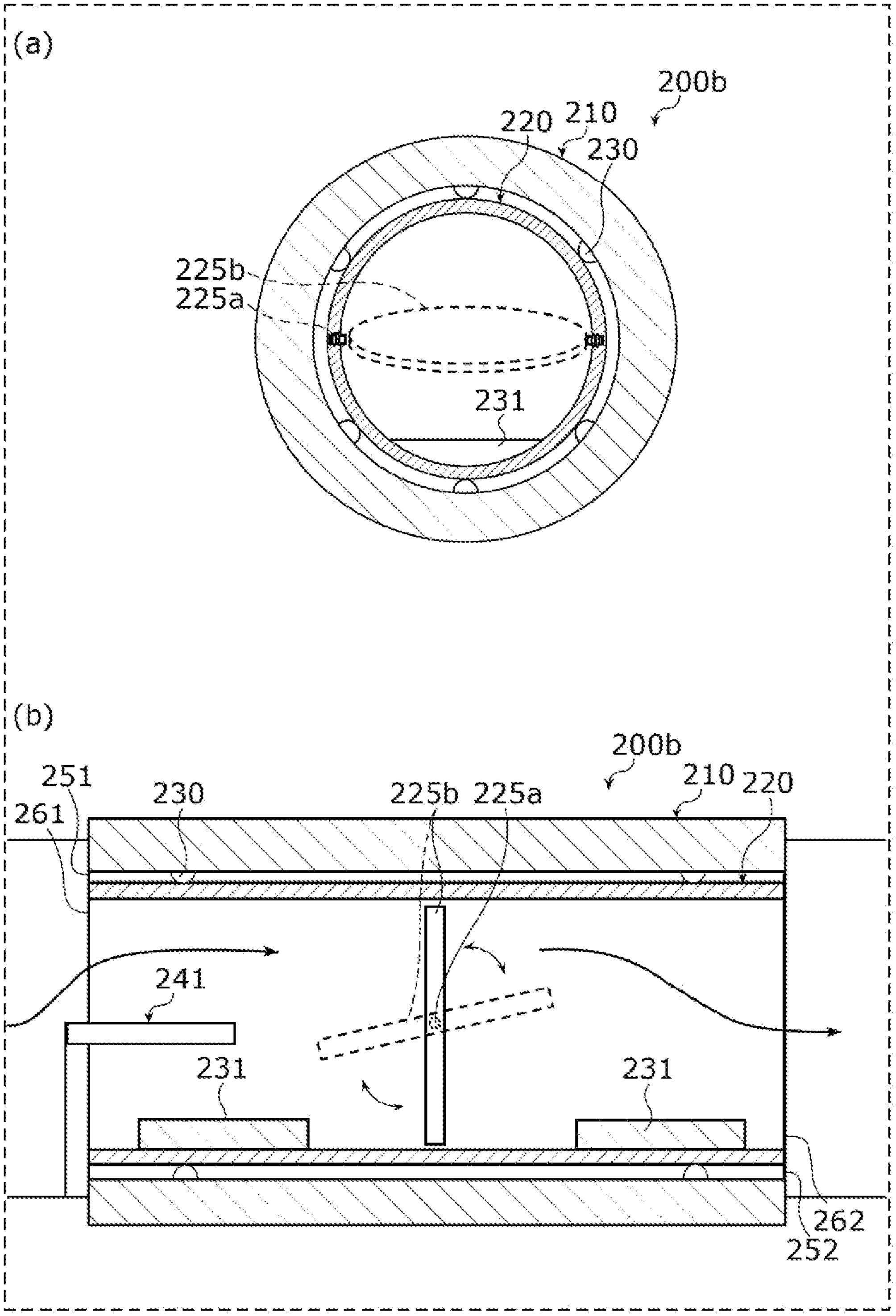
FIG. 25 shows cross sectional views of a first damper in Example 2 of Variation 2 of Embodiment 2.
Figure 26:
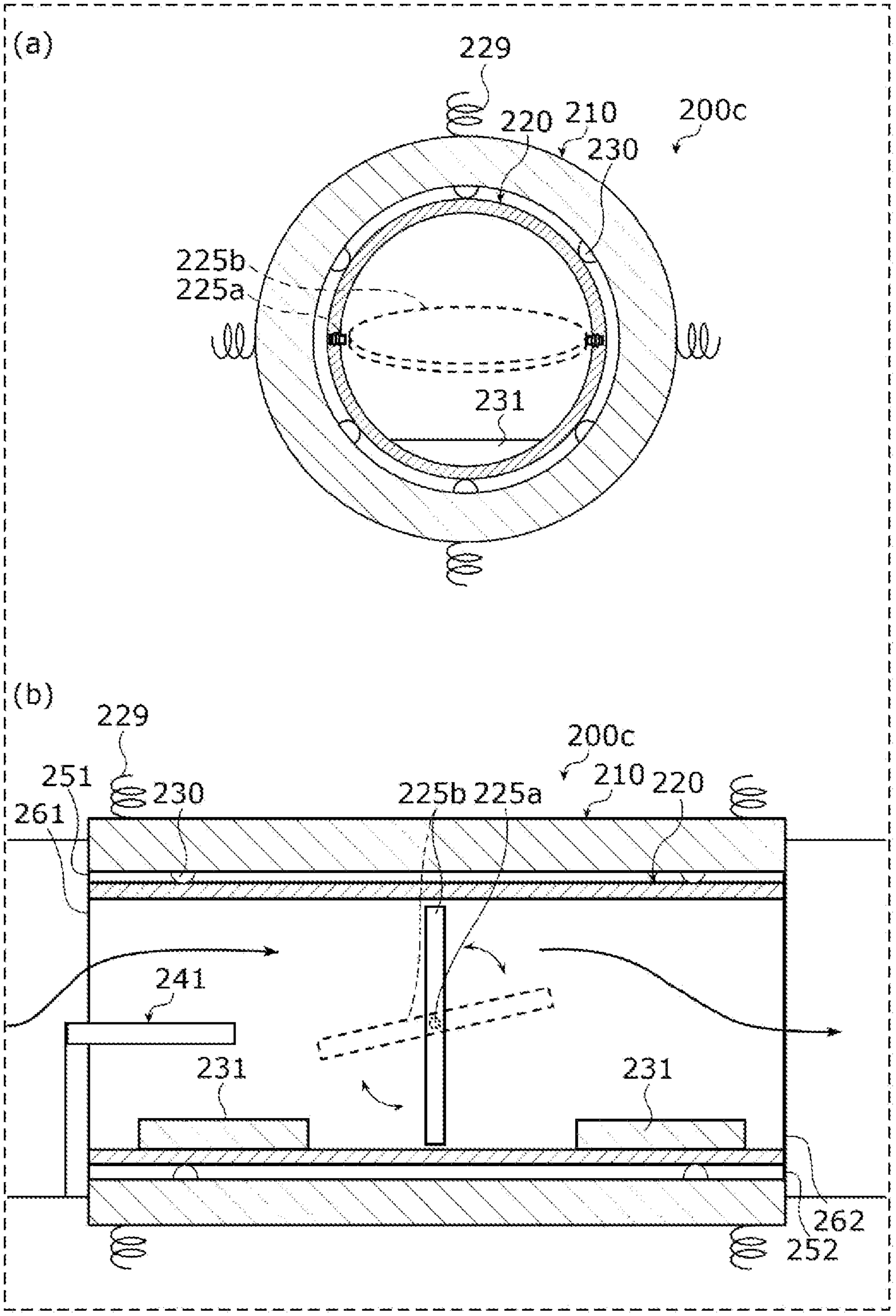
FIG. 26 shows other cross sectional views of a first damper in Example 2 of Variation 2 of Embodiment 2.

FIG. 25 shows cross sectional views of first damper 200*b* in Example 2 of Variation 2 of Embodiment 2. FIG. 26 shows other cross sectional views of first damper 200*c* in Example 2 of Variation 2 of Embodiment 2.

First damper 200*b* in this example includes shaft 225*a*, first flap 225*b*, first inner barrel 220, first outer barrel 210, rotation mechanism 230, weight 231, and wall portion 241.

Shaft 225*a* extends in a direction orthogonal to the central axis of first inner barrel 220, and both ends are connected to the inner circumferential surface of first inner barrel 220. First flap 225*b* is in a disc shape, and can rotate inside first inner barrel 220. Shaft 225*a* is coupled to first flap 225*b* in the diameter direction of first flap in a disc shape. Note that when the flow rate of air is zero, shaft 225*a* includes a spring to bring first flap 225*b* to a position indicated by the solid line in (b) of FIG. 25. Rotation mechanism 230 is provided between first outer barrel 210 and first inner barrel 220, in such a manner that first inner barrel 220 rotates with respect to first outer barrel 210. Weight 231 is provided at first inner barrel 220. In this example, weight 231 is provided along the central axis of first inner barrel 220 and wall portion 241.

Both ends of first outer barrel 210 and first inner barrel 220 are open. Outer-barrel intake port 251 is provided at an end of first outer barrel 210, whereas inner-barrel intake port 261 is provided at an end of first inner barrel 220. Outer-barrel blowing port 252 is provided at the other end of first outer barrel 210, whereas inner-barrel blowing port 262 is provided at the other end of first inner barrel 220.

Wall portion 241 is provided, covering a portion of outer-barrel intake port 251 and a portion of inner-barrel intake port 261. When outer-barrel intake port 251, inner-barrel intake port 261, and first flap 225*b* are viewed being overlapped, wall portion 241 covers a fixed end of first flap 225*b* to guide air to a portion of a free end of first flap 225*b*. Accordingly, air from blower 20 flows toward the free end of first flap 225*b* by being guided by wall portion 241. Accordingly, first flap 225*b* is caused to rotate by air. The fixed end is a coupled portion in which first flap 225*b* and shaft 225*a* in a stick shape overlap. The free end is a portion other than shaft 225*a*.

Note that Examples 1 and 2 explained above can be combined freely. For example, as illustrated in FIG. 26, as first damper 200*c*, vibration absorbing mechanism 229 may be applied to the configuration of first damper 200*b* in Example 2.

In such a seat air-conditioning device according to this variation, first damper 200*b* includes wall portion 241 provided to cover a portion of outer-barrel intake port 251 and a portion of inner-barrel intake port 261. When outer-barrel intake port 251, inner-barrel intake port 261, and first flap 225*b* are viewed being overlapped, wall portion 241 covers a fixed end of first flap 225*b* to guide air to a portion of a free end of first flap 225*b*.

According to this, wall portion 241 can guide air to the free end of first flap 225*b*, and thus first flap 225*b* can be caused to efficiency rotate.

In the seat air-conditioning device according to this variation, the second damper includes a wall portion provided to cover a portion of an outer-barrel intake port and a portion of an inner-barrel intake port. When the outer-barrel intake port, the inner-barrel intake port, and the second flap are viewed being overlapped, the wall portion covers a fixed end of the second flap to guide air to a portion of a free end of the second flap.

Also in this case, operational effects similar to those stated above can be achieved.

Other Embodiments

The above has explained the seat air-conditioning devices according to the present disclosure, based on Embodiments 1 and 2 stated above, yet the present disclosure is not limited to such Embodiment 1 or 2. The configuration of Embodiment 1 is assumed to include Variations 1 and 2 of Embodiment 1, and the configuration of Embodiment 2 is assumed to include Variations 1 and 2 of Embodiment 2.

Figure 27:
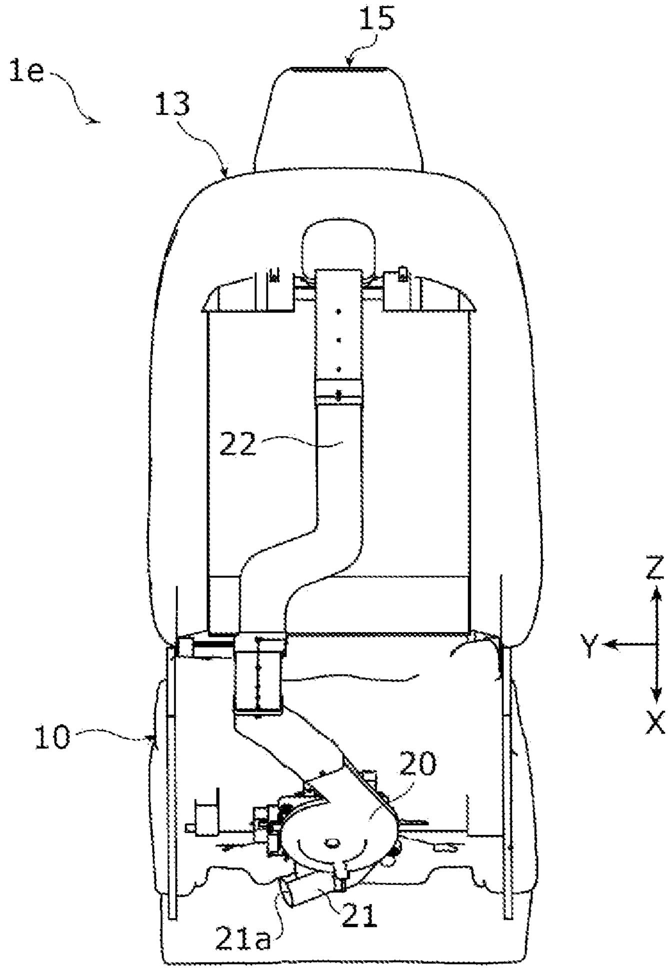
FIG. 27 is a perspective view of a seat air-conditioning device according to another variation.

For example, the seat air-conditioning devices according to Embodiments 1 and 2 above may have a configuration as illustrated in FIG. 27. FIG. 27 is a perspective view of seat air-conditioning device 1*e* according to another variation. FIG. 27 illustrates a state of seat air-conditioning device 1*e* from behind and below. As illustrated in FIG. 27, blower 20 may be provided on the Z-axis negative side of seating portion 10. Although not illustrated, blower 20 may be provided inside seating portion 10. Accordingly, the position in which blower 20 is provided is not limited in particular. In this case, inlet duct 21 is provided on the Z-axis negative side of seating portion 10, and thus inlet opening 21*a* of inlet duct 21 is also provided on the Z-axis negative side of seating portion 10.

In the seat air-conditioning devices according to Embodiments 1 and 2 above, the position in which the first damper is provided and the position in which the second damper is provided may be switched.

The seat air-conditioning devices according to Embodiments 1 and 2 explained above may not include a heat exchanger. Accordingly, the heat exchanger is not an essential element of the seat air-conditioning devices.

The controllers included in the seat air-conditioning devices according to Embodiments 1 and 2 above are implemented as large scale integrations (LSIs) that are typical integrated circuits. These may be individually formed into a single chip, or formed into a single chip so as to include some or all of the functions.

Moreover, the way to achieve integration is not limited to LSI, and a dedicated circuit or a general purpose processor can also achieve the integration. A field programmable gate array (FPGA) that can be programmed or a reconfigurable processor that allows reconfiguration of the connections and settings of the circuit cells inside the LSI may also be used.

Note that in each of Embodiments 1 and 2 above, the controller may be acquired using dedicated hardware, or may be implemented by executing a software program suitable for the element. Each element may be implemented using a program executor such as a CPU or a processor reading and executing a software program recorded on a recording medium such as a hard disk or semiconductor memory.

Split of functional blocks in the block diagrams is an example, and thus a plurality of functional blocks may be implemented as one functional block, one functional block may be split into a plurality of blocks, or some functions may be transferred to another functional block. Single hardware or software may process similar functions of a plurality of functional blocks, in parallel or by time division.

The present disclosure also encompasses embodiments resulting from adding, to Embodiments 1 and 2, various modifications, and embodiments implemented by combining elements and functions in Embodiments 1 and 2 in any manner without departing from the scope of the present disclosure.

(Appendix 1)

Features of the seat air-conditioning devices explained based on Embodiments 1 and 2 above are shown in the following.

<Technical Feature 1>

A seat air-conditioning device for use in a seat, the seat air-conditioning device comprising:

a blower provided in the seat;

a first ventilation path that is provided in the seat and leads, to an upper body of a person seated in the seat, air blown by the blower and to be blown out from a first outlet;

a second ventilation path that is provided in the seat and leads, to the upper body of the person seated in the seat, air blown by the blower and to be blown out from a second outlet; and an air-volume control mechanism that is provided in the seat, and passively controls a first air volume of air blown out from the first outlet and a second air volume of air blown out from the second outlet.

<Technical Feature 2>

The seat air-conditioning device according to Technical Feature 1, further comprising:

a controller that controls operation of the blower, wherein the controller controls the first air volume and the second air volume by controlling the blower to adjust an orientation of the air-volume control mechanism.

<Technical Feature 3>

The seat air-conditioning device according to Technical Feature 2, wherein the controller decreases a ratio of the first air volume to the second air volume as time elapses, by controlling the blower to adjust the orientation of the air-volume control mechanism.

<Technical Feature 4>

The seat air-conditioning device according to Technical Feature 2 or 3, wherein the controller controls the first air volume and the second air volume by controlling the blower to adjust the orientation of the air-volume control mechanism, based on at least one of a temperature in a cabin in which the seat is provided, a temperature of a person present in the cabin, or a control instruction given to an air-conditioning device provided in a vehicle.

<Technical Feature 5>

The seat air-conditioning device according to any one of Technical Features 2 to 4, wherein the controller causes an air velocity of air blown out from the first outlet to be higher than an air velocity of air blown out from the second outlet, by controlling the blower to adjust the orientation of the air-volume control mechanism.

<Technical Feature 6>

The seat air-conditioning device according to any one of Technical Features 2 to 5, wherein by controlling the blower to adjust the orientation of the air-volume control mechanism, the controller:

keeps the first air volume substantially zero during a predetermined period from when operation of the seat air-conditioning device starts; and gradually increases the first air volume after the predetermined period elapses.

<Technical Feature 7>

The seat air-conditioning device according to any one of Technical Features 2 to 6, further comprising:

a plurality of third ventilation paths that are provided in the seat and lead, to the person seated in the seat, air blown by the blower and to be blown out from a plurality of third outlets.

<Technical Feature 8>

The seat air-conditioning device according to Technical Feature 7, wherein by controlling the blower to adjust the orientation of the air-volume control mechanism, the controller:

controls the first air volume of air blown out from the first outlet, the second air volume of air blown out from the second outlet, and a third air volume of air blown out from each of the plurality of third outlets; and controls a proportion of the third air volume relative to a sum total of the first air volume, the second air volume, and the third air volume.

<Technical Feature 9>

The seat air-conditioning device according to Technical Feature 8, wherein the controller decreases a proportion of the first air volume relative to the sum total and increases the proportion of the third air volume in conjunction with a decrease in the proportion of the first air volume, by controlling the blower to adjust the orientation of the air-volume control mechanism.

<Technical Feature 10>

The seat air-conditioning device according to Technical Feature 8, wherein the controller causes a sum of the first air volume and the second air volume to be greater than the third air volume, by controlling the blower to adjust the orientation of the air-volume control mechanism.

<Technical Feature 11>

The seat air-conditioning device according to any one of Technical Features 8 to 10, wherein by controlling the blower to adjust the orientation of the air-volume control mechanism, the controller:

causes air to be blown out from the second outlet and the plurality of third outlets; and increases air blown out from the first outlet after a predetermined period elapses.

<Technical Feature 12>

The seat air-conditioning device according to any one of Technical Features 2 to 11, wherein the air-volume control mechanism includes a first damper provided in a flow path between the first ventilation path and the blower, and the first damper includes a first flap caused to rotate by air flowing through the flow path.

<Technical Feature 13>

The seat air-conditioning device according to any one of Technical Features 8 to 11, wherein the air-volume control mechanism includes a first damper provided in a flow path between the first ventilation path and the blower, the first damper includes a first flap caused to rotate by air flowing through the flow path, and the first flap rotates to increase a proportion of the first air volume relative to the sum total, when output of the blower is set to at least predetermined output.

<Technical Feature 14>

The seat air-conditioning device according to any one of Technical Features 8 to 11, wherein the air-volume control mechanism includes a first damper provided in a flow path between the first ventilation path and the blower, the first damper includes a first flap that is caused to rotate by air flowing through the flow path, and the first flap rotates to increase the proportion of the third air volume relative to the sum total.

<Technical Feature 15>

The seat air-conditioning device according to any one of Technical Features 7 to 11, 13, or 14, wherein the air-volume control mechanism includes a second damper provided in a branch space connected to the first ventilation path and the plurality of third ventilation paths, and the second damper includes a second flap caused to rotate by air flowing through the branch space.

<Technical Feature 16>

The seat air-conditioning device according to any one of Technical Features 1 to 15, wherein a length of the first ventilation path is shorter than a length of the second ventilation path.

<Technical Feature 17>

The seat air-conditioning device according to any one of Technical Features 2 to 16, wherein the controller causes air having a first temperature to be blown out from the first outlet and causes air having a second temperature to be blown out from (i) the second outlet, (ii) the plurality of third outlets, or (iii) the second outlet and the plurality of third outlets, by controlling the blower to adjust the orientation of the air-volume control mechanism, the air having the second temperature resulting from mixing the air having the first temperature and air in a cabin.

<Technical Feature 18>

The seat air-conditioning device according to any one of Technical Features 7 to 11, 13, or 14, wherein the air-volume control mechanism includes a first damper provided in a flow path between the first ventilation path and the blower, the first damper includes a first flap caused to rotate by air flowing through the flow path, the air-volume control mechanism includes a second damper provided in a branch space connected to the first ventilation path and the plurality of third ventilation paths, the second damper includes a second flap caused to rotate by air flowing through the branch space, and the controller adjusts an orientation of the first flap and an orientation of the second flap by controlling output of the blower.

<Technical Feature 19>

The seat air-conditioning device according to any one of Technical Features 1 to 18, wherein an opening area of the first outlet is smaller than an opening area of the second outlet.

<Technical Feature 20>

The seat air-conditioning device according to any one of Technical Features 1 to 19, wherein a branch space into which air blown by the blower flows via an air-blow opening is provided in the seat, the first ventilation path and the second ventilation path are connected to the branch space, the first ventilation path and the air-blow opening are aligned in a straight line, and the second ventilation path branches and extends from the branch space at a position distant from the first ventilation path.

<Technical Feature 21>

The seat air-conditioning device according to Technical Feature 18, wherein the controller has:

a first mode executed in a most initial cooling stage;

a second mode executed in an initial cooling stage, which is subsequent to the first mode; and a third mode executed in a stable cooling stage, which is subsequent to the second mode, the controller counts a continuous use period from a point in time at which operation of the blower starts or obtains a state of a person, the controller performs one or more additional controls for controlling the blower, based on the continuous use period or the state of the person, and the controller performs at least one of:

(1) controlling the blower to switch between the second mode and the third mode when a first additional control included in the one or more additional controls is performed; or (2) controlling the blower to switch between the first mode and the second mode when a second additional control included in the one or more additional controls is performed.

<Technical Feature 22>

The seat air-conditioning device according to Technical Feature 21, wherein a cycle which includes a first period and a second period and in which modes are switched in the first additional control included in the one or more additional controls is longer than a cycle which includes a third period and a fourth period and in which modes are switched in the second additional control included in the one or more additional controls.

(Appendix 2)

Features of the seat air-conditioning devices explained based on Embodiments 1 and 2 above are shown in the following.

<Technical Feature 1>

A seat air-conditioning device for use in a seat, the seat air-conditioning device comprising:

a blower provided in the seat;

a first ventilation path that is provided in the seat and leads, to an upper body of a person seated in the seat, air blown by the blower and to be blown out from a first outlet;

a second ventilation path that is provided in the seat and leads, to the upper body of the person seated in the seat, air blown by the blower and to be blown out from a second outlet;

a first damper provided in the seat and in a flow path between (i) the blower and (ii) the first ventilation path and the second ventilation path; and a rotation adjuster provided in the flow path, wherein the first damper includes a first flap that is rotatable to passively control a flow rate of air that flows from the blower to the first ventilation path and the second ventilation path, the rotation adjuster adjusts rotation of the first flap, and by hitting the rotation adjuster, the first flap is displaceable between a closed position in which a flow of air flowing from the blower to the first ventilation path and the second ventilation path is reduced and an open position in which air flows from the blower to the first ventilation path and the second ventilation path.

<Technical Feature 2>

The seat air-conditioning device according to Technical Feature 1, further comprising:

a third ventilation path provided in the seat and leads, to an upper body of a person seated in the seat, air blown by the blower and to be blown out from a third outlet; and a second damper provided in a branch space connected to the first ventilation path and the third ventilation path, wherein the second damper includes a second flap that is caused to rotate by air flowing through the flow path, and the rotation adjuster includes a first rotation mechanism that causes the second flap to rotate.

<Technical Feature 3>

The seat air-conditioning device according to Technical Feature 1 or 2, wherein the seat includes a seat backrest that is rotatable and supports the upper body of the person seated in the seat, and the rotation adjuster hits the first flap when an angle of the seat backrest relative to a horizontal direction is from 60 degrees to 90 degrees.

<Technical Feature 4>

The seat air-conditioning device according to Technical Feature 2, wherein the seat includes a seat backrest that is rotatable and supports the upper body of the person seated in the seat, the second damper includes a shaft that rotatably and axially supports the second flap, and when the angle of the seat backrest relative to the horizontal direction is in a range from 60 degrees to 90 degrees, the first rotation mechanism decreases rotation moment about the shaft applied to the second flap due to gravity.

<Technical Feature 5>

The seat air-conditioning device according to any one of Technical Features 1 to 4, wherein the rotation adjuster includes a stopper that restricts reverse rotation of the first flap from the closed position.

<Technical Feature 6>

The seat air-conditioning device according to any one of Technical Features 1 to 5, wherein the rotation adjuster is provided in the flow path, the rotation adjuster not completely closing the flow path.

<Technical Feature 7>

The seat air-conditioning device according to any one of Technical Features 1 to 6, wherein in a portion of the flow path in which the rotation adjuster is provided, at least 50% of the portion in a width direction orthogonal to a longitudinal direction of the flow path is open.

<Technical Feature 8>

The seat air-conditioning device according to Technical Feature 4, wherein the first rotation mechanism is a counterweight provided across from the second flap that rotates about an axis.

<Technical Feature 9>

The seat air-conditioning device according to any one of Technical Features 1 to 8, wherein the rotation adjuster includes a second rotation mechanism that causes the first flap to rotate.

<Technical Feature 10>

The seat air-conditioning device according to any one of Technical Features 1 to 9, wherein the first damper includes:

a first inner barrel that rotatably supports the first flap; and a first outer barrel that accommodates the first inner barrel, and the rotation adjuster includes a rotation mechanism provided between the first inner barrel and the first outer barrel.

<Technical Feature 11>

The seat air-conditioning device according to Technical Feature 2 or 9, wherein the second damper includes:

a second inner barrel that rotatably supports the second flap; and a second outer barrel that accommodates the second inner barrel, and the rotation adjuster includes a rotation mechanism provided between the second inner barrel and the second outer barrel.

<Technical Feature 12>

The seat air-conditioning device according to Technical Feature 10, wherein the rotation mechanism rotatably supports the first inner barrel inside the first outer barrel.

<Technical Feature 13>

The seat air-conditioning device according to Technical Feature 11, wherein the rotation mechanism rotatably supports the second inner barrel inside the second outer barrel.

<Technical Feature 14>

The seat air-conditioning device according to Technical Feature 10 or 12, wherein the rotation mechanism is a bearing that rotatably supports the first inner barrel inside the first outer barrel.

<Technical Feature 15>

The seat air-conditioning device according to Technical Feature 11 or 13, wherein the rotation mechanism is a bearing that rotatably supports the second inner barrel inside the second outer barrel.

<Technical Feature 16>

The seat air-conditioning device according to Technical Feature 10, 12, or 14, wherein the first outer barrel includes an outer-barrel intake port through which air from the blower flows in, the first inner barrel includes an inner-barrel intake port through which air from the blower flows in via the outer-barrel intake port, the first outer barrel includes an outer-barrel blowing port that leads air that has flown in through the inner-barrel intake port to the first ventilation path and the second ventilation path, the first inner barrel includes an inner-barrel blowing port through which air that has flown in through the inner-barrel intake port is blown out via the outer-barrel blowing port, the outer-barrel intake port has an opening area greater than an opening area of the inner-barrel intake port, and the outer-barrel blowing port has an opening area greater than an opening area of the inner-barrel blowing port.

<Technical Feature 17>

The seat air-conditioning device according to Technical Feature 11, 13, or 15, wherein the second outer barrel includes an outer-barrel intake port through which air from the blower flows in, the second inner barrel includes an inner-barrel intake port through which air from the blower flows in via the outer-barrel intake port, the second outer barrel includes an outer-barrel blowing port that leads air that has flown in through the inner-barrel intake port to the third ventilation path, the second inner barrel includes an inner-barrel blowing port through which air that has flown in through the inner-barrel intake port is blown out via the outer-barrel blowing port, the outer-barrel intake port has an opening area greater than an opening area of the inner-barrel intake port, and the outer-barrel blowing port has an opening area greater than an opening area of the inner-barrel blowing port.

<Technical Feature 18>

The seat air-conditioning device according to Technical Feature 10, 12, 14, or 16, wherein the first damper includes a weight provided in the first inner barrel.

<Technical Feature 19>

The seat air-conditioning device according to Technical Feature 11, 13, 15, or 17, wherein the second damper includes a weight provided in the second inner barrel.

<Technical Feature 20>

The seat air-conditioning device according to Technical Feature 10, 12, 14, 16, or 18, the first damper is connected to the first outer barrel, and includes a vibration absorbing mechanism that absorbs a vibration transmitted to the seat.

<Technical Feature 21>

The seat air-conditioning device according to Technical Feature 11, 13, 15, 17, or 19, wherein the second damper is connected to the second outer barrel, and includes a vibration absorbing mechanism that absorbs a vibration transmitted to the seat.

<Technical Feature 22>

The seat air-conditioning device according to Technical Feature 20, wherein the vibration absorbing mechanism is at least one of a set of springs or a shock absorber provided between the seat and the first outer barrel.

<Technical Feature 23>

The seat air-conditioning device according to Technical Feature 21, wherein the vibration absorbing mechanism is at least one of a set of springs or a shock absorber provided between the seat and the second outer barrel.

<Technical Feature 24>

The seat air-conditioning device according to Technical Feature 16, 18, 20, or 22, the first damper includes a wall portion provided covering a portion of the outer-barrel intake port and a portion of the inner-barrel intake port, and when the outer-barrel intake port, the inner-barrel intake port, and the first flap are viewed being overlapped, the wall portion covers a fixed end of the first flap to guide air to a portion of a free end of the first flap.

<Technical Feature 25>

The seat air-conditioning device according to Technical Feature 17, 19, 21, or 23, wherein the second damper includes a wall portion provided covering a portion of the outer-barrel intake port and a portion of the inner-barrel intake port, and when the outer-barrel intake port, the inner-barrel intake port, and the second flap are viewed being overlapped, the wall portion covers a fixed end of the second flap to guide air to a portion of a free end of the second flap.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2023-058940 filed on Mar. 31, 2023, Japanese Patent Application No. 2023-058941 filed on Mar. 31, 2023, and Japanese Patent Application No. 2023-216066 filed on Dec. 21, 2023.

INDUSTRIAL APPLICABILITY

The present disclosure is applicable to a seat or a sofa, for instance, for a movable body such as a vehicle, for example.

The invention claimed is:

1. A seat air-conditioning device for use in a seat, the seat air-conditioning device comprising:

a blower provided in the seat;

a first ventilation path that is provided in the seat and leads, to an upper body of a person seated in the seat, air blown by the blower and to be blown out from a first outlet;

a second ventilation path that is provided in the seat and leads, to the upper body of the person seated in the seat, air blown by the blower and to be blown out from a second outlet; and an air-volume control mechanism that is provided in the seat, and passively controls a first air volume of air blown out from the first outlet and a second air volume of air blown out from the second outlet.

2. The seat air-conditioning device according to claim 1, further comprising:

a controller that controls operation of the blower, wherein the controller controls the first air volume and the second air volume by controlling the blower to adjust an orientation of the air-volume control mechanism.

3. The seat air-conditioning device according to claim 2, wherein the controller decreases a ratio of the first air volume to the second air volume as time elapses, by controlling the blower to adjust the orientation of the air-volume control mechanism.

4. The seat air-conditioning device according to claim 2, wherein the controller controls the first air volume and the second air volume by controlling the blower to adjust the orientation of the air-volume control mechanism, based on at least one of a temperature in a cabin in which the seat is provided, a temperature of a person present in the cabin, or a control instruction given to an air-conditioning device provided in a vehicle.

5. The seat air-conditioning device according to claim 2, wherein the controller causes an air velocity of air blown out from the first outlet to be higher than an air velocity of air blown out from the second outlet, by controlling the blower to adjust the orientation of the air-volume control mechanism.

6. The seat air-conditioning device according to claim 2, wherein by controlling the blower to adjust the orientation of the air-volume control mechanism, the controller:
keeps the first air volume substantially zero during a predetermined period from when operation of the seat air-conditioning device starts; and
gradually increases the first air volume after the predetermined period elapses.

7. The seat air-conditioning device according to claim 2, further comprising:
a plurality of third ventilation paths that are provided in the seat and lead, to the person seated in the seat, air blown by the blower and to be blown out from a plurality of third outlets.

8. The seat air-conditioning device according to claim 7, wherein by controlling the blower to adjust the orientation of the air-volume control mechanism, the controller:
controls the first air volume of air blown out from the first outlet, the second air volume of air blown out from the second outlet, and a third air volume of air blown out from each of the plurality of third outlets; and
controls a proportion of the third air volume relative to a sum total of the first air volume, the second air volume, and the third air volume.

9. The seat air-conditioning device according to claim 8, wherein the controller decreases a proportion of the first air volume relative to the sum total and increases the proportion of the third air volume in conjunction with a decrease in the proportion of the first air volume, by controlling the blower to adjust the orientation of the air-volume control mechanism.

10. The seat air-conditioning device according to claim 8, wherein the controller causes a sum of the first air volume and the second air volume to be greater than the third air volume, by controlling the blower to adjust the orientation of the air-volume control mechanism.

11. The seat air-conditioning device according to claim 8, wherein by controlling the blower to adjust the orientation of the air-volume control mechanism, the controller:
causes air to be blown out from the second outlet and the plurality of third outlets; and
increases air blown out from the first outlet after a predetermined period elapses.

12. The seat air-conditioning device according to claim 2, wherein the air-volume control mechanism includes a first damper provided in a flow path between the first ventilation path and the blower, and
the first damper includes a first flap caused to rotate by air flowing through the flow path.

13. The seat air-conditioning device according to claim 8, wherein the air-volume control mechanism includes a first damper provided in a flow path between the first ventilation path and the blower,
the first damper includes a first flap caused to rotate by air flowing through the flow path, and
the first flap rotates to increase a proportion of the first air volume relative to the sum total, when output of the blower is set to at least predetermined output.

14. The seat air-conditioning device according to claim 8, wherein the air-volume control mechanism includes a first damper provided in a flow path between the first ventilation path and the blower,
the first damper includes a first flap that is caused to rotate by air flowing through the flow path, and
the first flap rotates to increase the proportion of the third air volume relative to the sum total.

15. The seat air-conditioning device according to claim 7, wherein the air-volume control mechanism includes a second damper provided in a branch space connected to the first ventilation path and the plurality of third ventilation paths, and
the second damper includes a second flap caused to rotate by air flowing through the branch space.

16. The seat air-conditioning device according to claim 1, wherein a length of the first ventilation path is shorter than a length of the second ventilation path.

17. The seat air-conditioning device according to claim 7, wherein the controller causes air having a first temperature to be blown out from the first outlet and causes air having a second temperature to be blown out from (i) the second outlet, (ii) the plurality of third outlets, or (iii) the second outlet and the plurality of third outlets, by controlling the blower to adjust the orientation of the air-volume control mechanism, the air having the second temperature resulting from mixing the air having the first temperature and air in a cabin.

18. The seat air-conditioning device according to claim 7, wherein the air-volume control mechanism includes a first damper provided in a flow path between the first ventilation path and the blower,
the first damper includes a first flap caused to rotate by air flowing through the flow path,
the air-volume control mechanism includes a second damper provided in a branch space connected to the first ventilation path and the plurality of third ventilation paths,
the second damper includes a second flap caused to rotate by air flowing through the branch space, and
the controller adjusts an orientation of the first flap and an orientation of the second flap by controlling output of the blower.

19. The seat air-conditioning device according to claim 7, wherein an opening area of the first outlet is smaller than an opening area of the second outlet.

20. The seat air-conditioning device according to claim 1, wherein a branch space into which air blown by the blower flows via an air-blow opening is provided in the seat,
the first ventilation path and the second ventilation path are connected to the branch space,
the first ventilation path and the air-blow opening are aligned in a straight line, and
the second ventilation path branches and extends from the branch space at a position distant from the first ventilation path.

* * * * *